(12) United States Patent
Shibata

(10) Patent No.: US 11,580,369 B2
(45) Date of Patent: Feb. 14, 2023

(54) INFERENCE APPARATUS, CONVOLUTION OPERATION EXECUTION METHOD, AND PROGRAM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 16/757,543

(22) PCT Filed: Oct. 22, 2018

(86) PCT No.: PCT/JP2018/039248
§ 371 (c)(1),
(2) Date: Apr. 20, 2020

(87) PCT Pub. No.: WO2019/082859
PCT Pub. Date: May 2, 2019

(65) Prior Publication Data
US 2021/0201120 A1    Jul. 1, 2021

(30) Foreign Application Priority Data
Oct. 23, 2017    (JP) .............................. JP2017-204610

(51) Int. Cl.
*G06N 3/063*    (2006.01)
*G06F 7/544*    (2006.01)
(Continued)

(52) U.S. Cl.
CPC ........... *G06N 3/063* (2013.01); *G06F 7/5443* (2013.01); *G06K 9/6217* (2013.01); *G06N 3/04* (2013.01);
(Continued)

(58) Field of Classification Search
None
See application file for complete search history.

(56) References Cited

U.S. PATENT DOCUMENTS

| 2010/0214936 | A1 | 8/2010 | Ito et al. |
| 2011/0239032 | A1 | 9/2011 | Kato et al. |

(Continued)

FOREIGN PATENT DOCUMENTS

| CN | 106447034 A | 2/2017 |
| JP | 2009-080693 A | 4/2009 |

(Continued)

OTHER PUBLICATIONS

International Search Report for PCT Application No. PCT/JP2018/039248, dated Jan. 15, 2019.
(Continued)

*Primary Examiner* — David Perlman

(57) ABSTRACT

An inference apparatus comprises a plurality of PEs (Processing Elements) and a control part. The control part operates a convolution operation in a convolutional neural network using each of a plurality of pieces of input data and a weight group including a plurality of weights corresponding to each of the plurality of pieces of input data by controlling the plurality of PEs. Further, each of the plurality of PEs executes a computation including multiplication of a single piece of the input data by a single weight and also executes multiplication included in the convolution operation using an element with a non-zero value included in each of the plurality of pieces of input data.

20 Claims, 18 Drawing Sheets

(51) Int. Cl.
  *G06K 9/62*    (2022.01)
  *G06N 3/04*    (2006.01)
  *G06N 3/08*    (2006.01)
  *G06V 10/70*   (2022.01)

(52) U.S. Cl.
  CPC ............. *G06N 3/08* (2013.01); *G06V 10/70* (2022.01); *G06T 2207/20081* (2013.01)

(56) References Cited

U.S. PATENT DOCUMENTS

| | | | |
|---|---|---|---|
| 2016/0358070 | A1 | 12/2016 | Brothers et al. |
| 2017/0083792 | A1 | 3/2017 | Rodríguez et al. |
| 2017/0147301 | A1 | 5/2017 | Rong et al. |
| 2018/0046900 | A1* | 2/2018 | Dally ................. G06F 9/30018 |
| 2018/0082181 | A1* | 3/2018 | Brothers ............... G06N 3/082 |
| 2019/0087708 | A1* | 3/2019 | Goulding .............. G06N 3/082 |

FOREIGN PATENT DOCUMENTS

| | | |
|---|---|---|
| JP | 2010-134697 A | 6/2010 |
| JP | 2016-099707 A | 5/2016 |
| JP | 2017-062781 A | 3/2017 |
| JP | 2017-097863 A | 6/2017 |
| JP | 2017-156941 A | 9/2017 |

OTHER PUBLICATIONS

Song Han, et. al., "EIE: Efficient Inference Engine on Compressed Deep Neural Network", International Symposium on Computer Architecture (ISCA) 2016, USA.

Angshuman Parashar, et al., "SCNN: An Accelerator for Compressed-sparse Convolutional Neural Networks", ISCA 17 Proceedings of the 44th Annual International Symposium on Computer Architecture, 2017, USA.

Yoshiyuki Ohno, et al., "Optimization of Direct Sparse Convolution on Vector Processor" Jul. 19, 2017, vol. 2017-ARC-227, No. 16, pp. 1-7, ISSN 2188-8574, Japan.

* cited by examiner

FIG. 10A

| 0 | 0 | 1 | 0 | 0 | 0 | 0 | 0 | 1 |

FIG. 10B

| 3 | 0 | 1 | 1 | 0 | 2 | 1 | 2 | 1 |

INFERENCE APPARATUS, CONVOLUTION OPERATION EXECUTION METHOD, AND PROGRAM

REFERENCE TO RELATED APPLICATION

This application is a National Stage Entry of PCT/JP2018/039248 filed on Oct. 22, 2018, which claims priority from Japanese Patent Application 2017-204610 filed on Oct. 23, 2017, the contents of all of which are incorporated herein by reference, in their entirety.

FIELD

The present invention relates an inference apparatus, convolution operation execution method, and program.

BACKGROUND

In recent years, the development of the technology related to image recognition using a multilayer neural network has been quite active. This technology is also referred to as deep learning. In particular, convolutional neural networks are often used in the technical field of image recognition. As described later, a convolutional neural network includes a convolutional layer, a pooling layer, and a fully-connected layer. In the convolution layer, a process of convolving a kernel with an entire image is performed.

Through the process of convolving a kernel with an entire image (the process of applying a filter to the image), a set of features convolved with the image can be obtained. This set of features is also referred to as a feature map. The feature map is obtained by applying an activation function to the convolved values. For instance, in the field of image recognition, the ReLU (Rectified Linear Unit) is often used as an activation function.

As described above, in the convolutional layer, the process of convolving a kernel (weight, filter) with an image (input image) is performed. At this time, each pixel of the image is multiplied by the weight many times. Non-Patent Literatures 1 and 2 disclose technologies that reduce the load related to this multiplication processing. Specifically, Non-Patent Literatures 1 and 2 disclose technologies relating to the reduction of the number of multiplication operations by exploiting the fact that the result will be always zero when zero is multiplied by any value.

Non Patent Literature 1

Song Han, et. al., "EIE: Efficient Inference Engine on Compressed Deep Neural Network", International Symposium on Computer Architecture (ISCA) 2016.

Non Patent Literature 2

Angshuman Parashar, et. al., "SCNN: An Accelerator for Compressed-sparse Convolutional Neural Networks", ISCA '17 Proceedings of the 44th Annual International Symposium on Computer Architecture, 2017.

SUMMARY

The disclosures of Non Patent Literatures cited above are incorporated herein in their entirety by reference thereto. The following analysis is given by the inventors of the present invention.

As described above, an enormous amount of multiplication is required in deep learning, particularly in the operation of the convolutional layer. An enormous amount of multiplication demands large-scale hardware or a processor with powerful processing capability. In order to meet such requirements, the technologies disclosed in Non-Patent Literatures 1 and 2 are necessary.

The technology disclosed in Non-Patent Literature 1 aims at reducing the number of multiplication operations in the fully-connected layer (FC layer). Although it is also desirable to reduce the number of multiplication operations in the fully-connected layer, the number of multiplication operations in the convolutional layer is overwhelmingly larger than that in the fully-connected layer. The purpose of the technology disclosed in Non-Patent Literature 1 is to reduce the amount of multiplication processing in the fully-connected layer and cannot reduce the amount of multiplication processing in the convolutional layer.

It is a main object of the present invention to provide an inference apparatus, convolution operation execution method, and program that contribute to reducing the number of multiplication operations in the convolutional layer.

Solution to Problem

According to a first aspect of the present invention or disclosure, there is provided an inference apparatus comprising a plurality of PEs (Processing Elements), a control part that operates a convolution operation in a convolutional neural network using each of a plurality of pieces of input data and a weight group including a plurality of weights corresponding to each of the plurality of pieces of input data by controlling the plurality of PEs, and each of the plurality of PEs executing a computation including multiplication of a single piece of the input data by a single weight and also executing multiplication included in the convolution operation using an element with a non-zero value included in each of the plurality of pieces of input data.

According to a second aspect of the present invention or disclosure, there is provided a convolution operation execution method for an inference apparatus that includes a plurality of PEs (Processing Elements) each executing a computation including multiplication of a single piece of input data by a single weight and that operates a convolution operation in a convolutional neural network using each of a plurality of pieces of input data and a weight group including a plurality of weights corresponding to each of the plurality of pieces of input data, and the convolution operation execution method includes causing each of the plurality of PEs to identify an element with a non-zero value included in each of the plurality of pieces of input data, and causing each of the plurality of PEs to execute multiplication included in the convolution operation using the identified elements.

According to a third aspect of the present invention or disclosure, there is provided a program causing a computer provided in an inference apparatus that includes a plurality of PEs (Processing Elements) each executing a computation including multiplication of a single piece of input data by a single weight and that operates a convolution operation in a convolutional neural network using each of a plurality of pieces of input data and a weight group including a plurality of weights corresponding to each of the plurality of pieces of input data to execute identifying an element with a non-zero value included in each of the plurality of pieces of input data, and executing multiplication included in the convolution operation using the identified elements.

Further, this program may be stored in a computer-readable storage medium. The storage medium may be a non-transient one such as a semiconductor memory, hard disk, magnetic recording medium, and optical recording medium. The present invention may be realized as a computer program product.

According to each aspect of the present invention or disclosure, there are provided an inference apparatus, convolution operation execution method, and program that contribute to reducing the number of multiplication operations in the convolutional layer.

BRIEF DESCRIPTION OF THE DRAWINGS

FIGS. 10A and 10B are drawings showing an example of two different pieces of input data.

FIGS. 13A and 13B are drawings for explaining the operation of the convolutional layer control section relating to the third exemplary embodiment.

PREFERRED MODES

Figure 1:
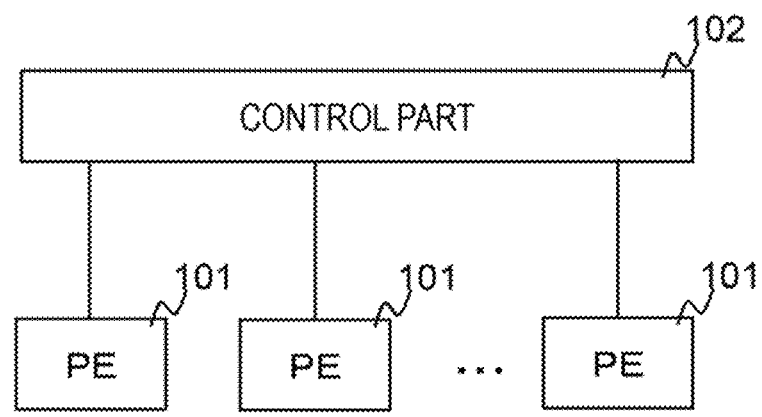
FIG. 1 is a drawing for explaining an outline of an exemplary embodiment.

First, an outline of an exemplary embodiment will be described. Note that drawing reference signs in the outline are given to each element as an example solely to facilitate understanding for convenience, and the description in the outline is not intended to limit the present invention. Further, connection lines between blocks in the drawings can be both bidirectional and unidirectional. Unidirectional arrows schematically indicate main flows of signals (data) and do not exclude bidirectionality. In addition, in circuit diagrams, block diagrams, internal configuration diagrams, and connection diagrams shown in the disclosure of the present application, an input port and output port exist at an input end and output end of each connection line, respectively, although not explicitly shown. The same applies to input/output interfaces.

An inference apparatus 100 relating to an exemplary embodiment comprises a plurality of PEs (Processing Elements) 101 and a control part 102 (refer to FIG. 1). By controlling the plurality of PEs 101, the control part 102 operates a convolution operation in a convolutional neural network using each of a plurality of pieces of input data and a weight group including a plurality of weights corresponding to each of the plurality of pieces of input data. Further, each of the plurality of PEs 101 executes a computation including a process of multiplying a single piece of the input data by a single weight and also executes a multiplication process included in the convolution operation using an element with a non-zero value included in each of the plurality of pieces of input data.

As described above, the implementation of the convolutional layer requires a great deal of multiplication processing, but each PE 101 included in the inference apparatus 100 does not perform multiplication processing on input data that is zero and the weight when executing multiplication processing. This will reduces the number of multiplication operations in the convolutional layer.

The following describes concrete exemplary embodiments in more detail with reference to the drawings. In each exemplary embodiment, the same elements are denoted by the same reference signs, and the description thereof will be omitted.

Exemplary Embodiment 1

A first exemplary embodiment will be described in detail with reference to the drawings.

Figure 2:
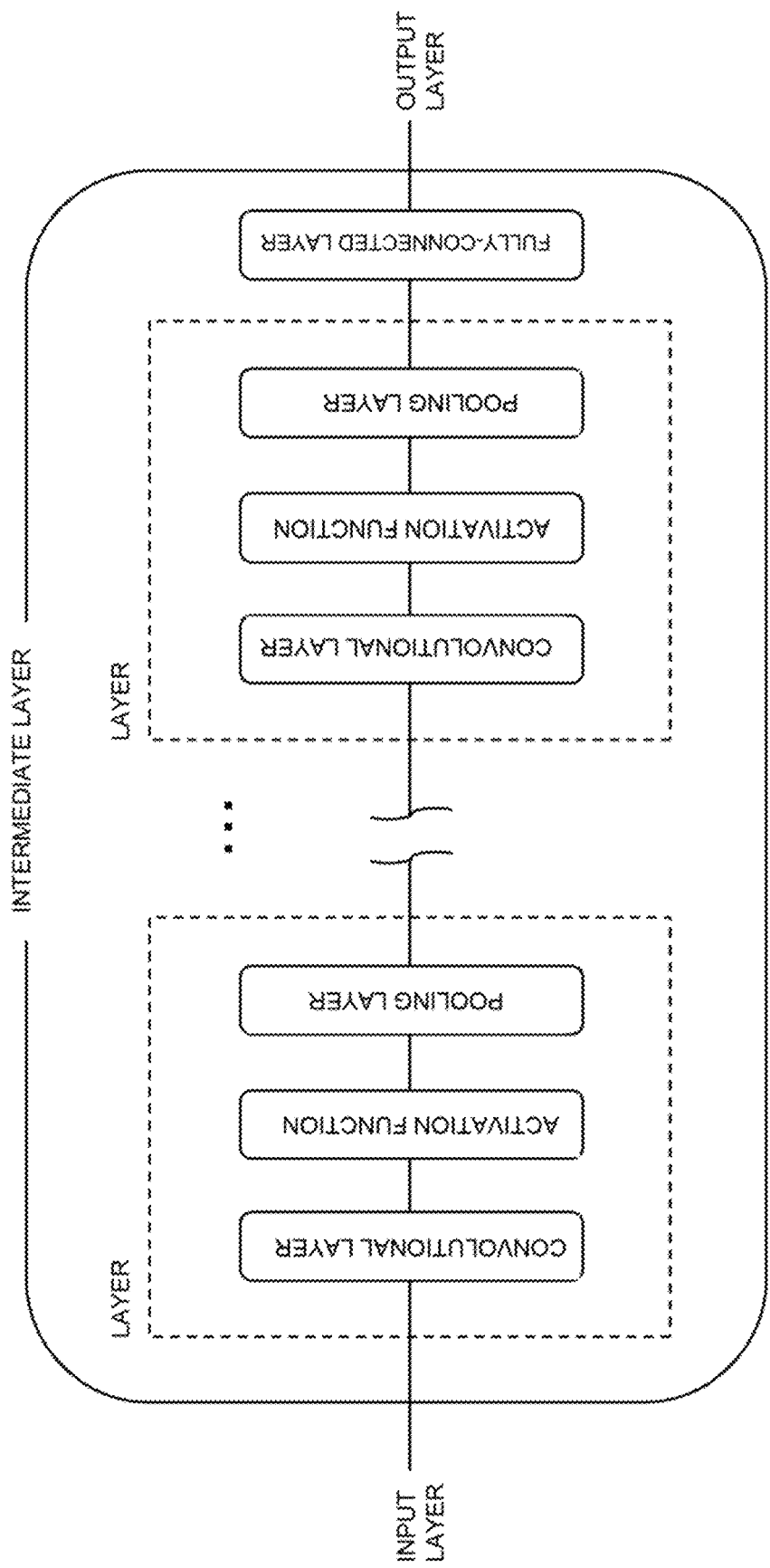
FIG. 2 is a drawing for explaining the structure of an intermediate layer (hidden layer) in image recognition.

FIG. 2 is a drawing for explaining the structure of an intermediate layer (hidden layer) in image recognition. With reference to FIG. 2, an input layer and the intermediate layer are connected, and the intermediate layer and an output layer are connected. Note that, in the first exemplary embodiment, image data is assumed as data supplied to the input layer. The input layer creates data to be outputted to the intermediate layer from the acquired input data. For instance, when the image data is constituted by three channels of RGB (Red Green Blue), the input layer generates image data of each color and outputs the generated data to the intermediate layer. The intermediate layer combines data of features extracted from the input data by a convolutional neural network (CNN) into one node, and outputs a feature variable. The output layer classifies the input data on the basis of the feature variable obtained from the intermediate layer.

The intermediate layer includes a plurality of "layers" with the first layer being connected to the input layer and the last layer being connected to the fully-connected layer.

Each of the layers constituting the intermediate layer may include a convolutional layer, an activation function, and a pooling layer. Note that the structure shown in FIG. 2 is merely an example and is not intended to limit the structure of the intermediate layer. In some cases, the intermediate layer does not have to include an activation function and a pooling layer.

The convolutional layer extracts feature values from the acquired input data. The activation function is applied to the extracted feature values, and the resulting feature values after the activation function has been applied is supplied to the pooling layer. The pooling layer combines the acquired feature values. At this time, in the pooling layer, a process (process for ensuring invariance) is performed so that the identity of an object can be determined even if the position of the object changes. For instance, a process for allowing the displacement of an object is performed in the pooling layer. Further, in FIG. 2, the layer for applying the "activation function" is independent of the convolutional layer and the pooling layer, however, the "activation function" may be included in any of these layers.

As shown in FIG. 2, the layers constituting the intermediate layer are cascade-connected, and the output of the preceding layer corresponds to the input of the subsequent layer.

Figure 3:
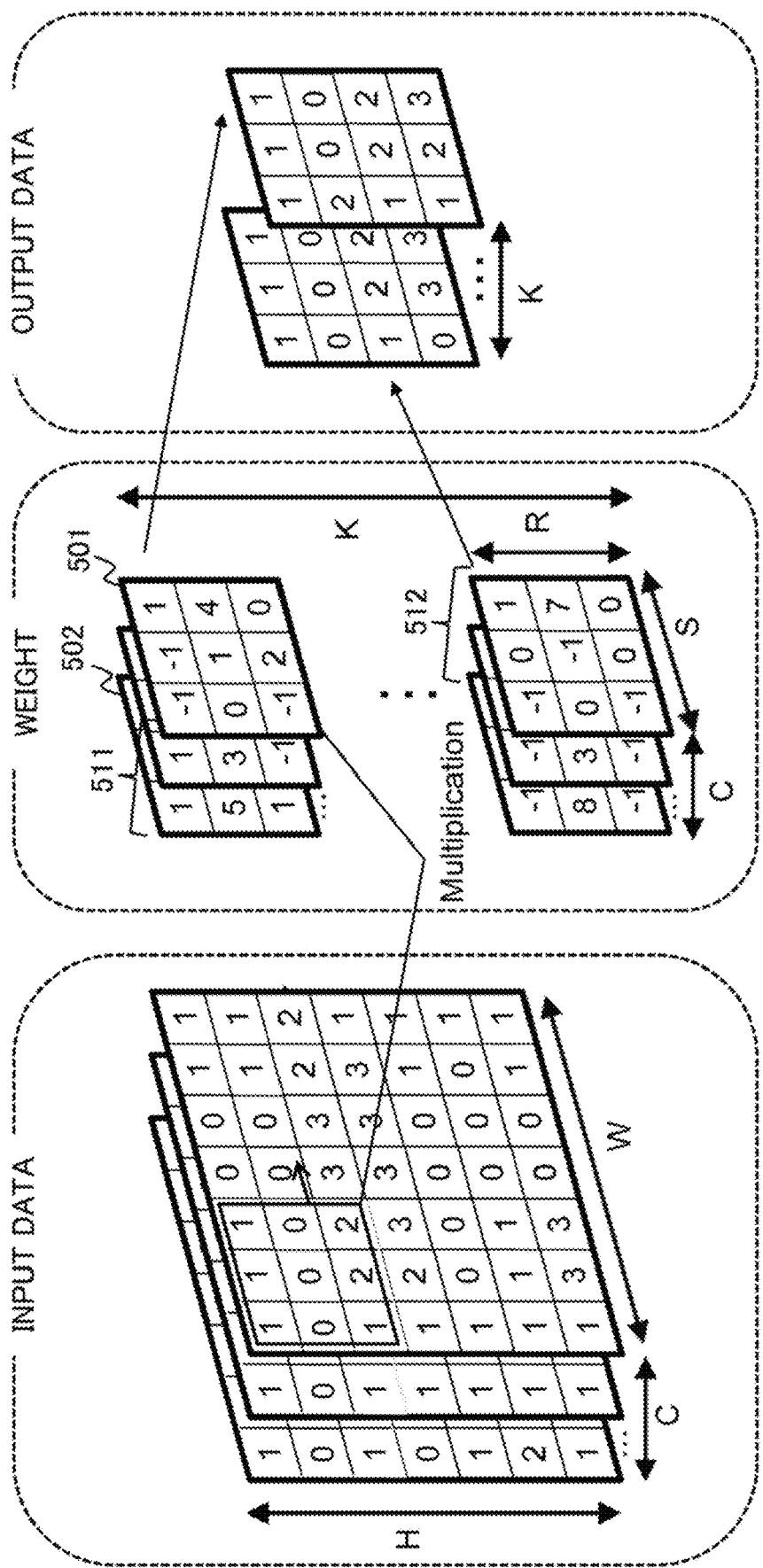
FIG. 3 is a drawing for explaining computation in a convolutional layer.

FIG. 3 is a drawing for explaining computation in the convolutional layer. With reference to FIG. 3, the convolutional layer outputs feature values by multiplying input data by a weight (filter).

Note that various parameters used in the disclosure of the present application are defined as shown in FIG. 3. A size in input data in one direction (the height direction in FIG. 3) is denoted as "H." Further, a size in the input data in another direction (the width direction in FIG. 3) is denoted as "W." For instance, if H=25 and W=25, the size of a piece of the input data will be 625 pixels (H25×W25=625). Further, the number of input channels in the layer is denoted as "C."

A size in a weight in one direction (the vertical direction in FIG. 3) is denoted as "R." Further, a size in the weight in another direction (the horizontal direction in FIG. 3) is denoted as "S." For instance, if R=3 and S=3, the size of a weight will be 9 (R3×S3=9).

"K" in FIG. 3 denotes the number of output channels in the layer. The number of output channels K in the layer matches the number of weight types. For instance, if the number of weight types in FIG. 3 is "4," the number of output channels K in the layer will be "4" as well.

One type of weight includes as many weights as the number of input channels C. For instance, if the number of input channels C is "3," a type of weight will include three weights. Each of C weights included in a type of weight corresponds to each of C pieces of input data. For instance, in FIG. 3, among C weights in the upper row, the foremost weights are associated with the foremost pieces of the input data.

Note that, in the disclosure of the present application, a set of weights allocated for each C input channels is referred to as a "weight group." Each weight group includes C weights. Further, since the number of types of weights matches the number of output channels K, the number of weights in the convolutional layer is given by K×C. In addition, the direction from one piece of input data or one weight to another piece of input data or another weight is referred to as the "channel direction" in the disclosure of the present application. Similarly, the direction from a weight group to another weight group is referred to as the "kernel direction." For instance, the direction from a weight 501 to a weight 502 shown in FIG. 3 is the channel direction, and the direction from a weight group 511 to a weight group 512 is the kernel direction.

In the convolutional layer, data corresponding to the size of a weight is extracted from the input data, an element included in the extracted data is multiplied by the corresponding element in the weight, and the multiplication results are added in the channel direction. For instance, as shown in FIG. 3, when the size of a weight is 3×3=9, data of the same size is extracted from the input data (for instance, the data delineated by a square window in the foremost input data shown in FIG. 3; data having a size of 3×3=9). Then each element in the extracted input data is multiplied by each element in the corresponding weight. For instance, in the example of FIG. 3, an upper-left element "1" in the extracted input data is multiplied by an upper-left element "−1" in the corresponding weight 501. This process is repeated in the convolutional layer (nine times in the example described above). The multiplication results are added thereafter. In the example described above, the results will be (−1)+(−1)+1+0+0+0+(−1)+4+0=2.

The multiplication of the extracted data and the weight is performed between the corresponding input data and the weight. For instance, in FIG. 3, the foremost input data corresponds to the foremost weight 501. Similarly, the input data shown in the middle corresponds to the weight in the middle, and the input data shown in the back corresponds to the weight 502 in the back. In this case, the multiplication/addition process described above is repeated between the corresponding input data and the weight.

Further, the results of the multiplication/addition process described above are added in the channel direction. For instance, in the case above, the multiplication/addition results in three channels (the foremost, middle, and back) are added.

The multiplication/addition process and the subsequent addition process is performed for each weight group. In the example of FIG. 3, the operations are performed using the weight group 511 in the upper row and the input data, and similar processing (the multiplication/addition process and the subsequent addition process using the same input data) is executed on the weight group 512 shown in the lower row.

In the convolutional layer, the above processing (the multiplication/addition process and the addition process in the channel direction) is repeated while extracting different pieces of the input data. For instance, as shown in the foremost input data in FIG. 3, the input data is cut out with the window of extraction being slid. The processing described above is applied to the extracted data.

Output data from the convolutional layer is obtained by repeating the process of extracting the input data, multiplying the extracted input data by a weight, and adding the results in the channel direction. Further, since the multiplication/addition processing on the input data and the weights is executed for each weight group as described above, the number of pieces of the obtained output data matches the number of weight types (the number of weight groups). For instance, when sixteen weight groups are provided, sixteen pieces of output data are obtained (K=16). Further, the size of each piece of output data (the size in the height and width directions) is determined by how the window for extracting data from the input data is slid. In the example of FIG. 3, data is extracted from the input data so that each piece of output data contains twelve (12=4×3) elements.

Figure 4:
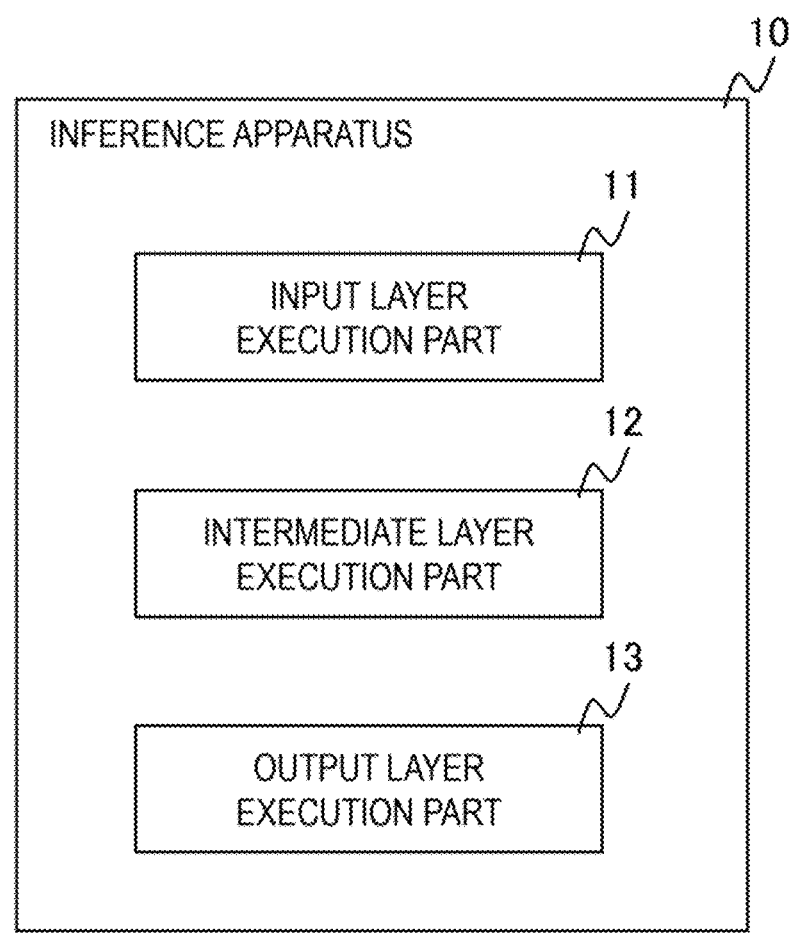
FIG. 4 is a drawing illustrating an example of an internal configuration of an inference apparatus relating to a first exemplary embodiment.
Figure 5:
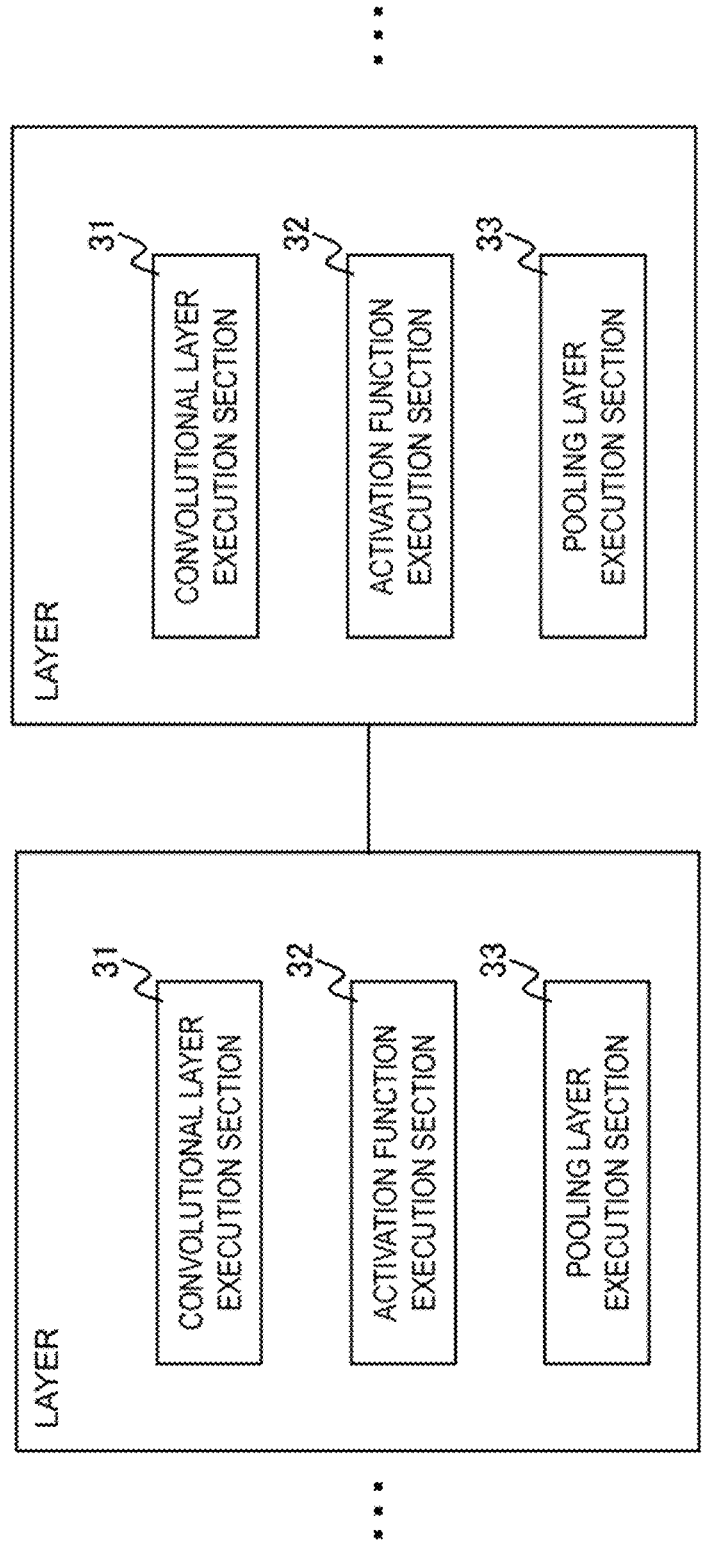
FIG. 5 is a drawing illustrating an example of an internal configuration of an intermediate layer execution part included in the inference apparatus relating to the first exemplary embodiment.

An inference apparatus 10 relating to the first exemplary embodiment executes the convolution operation described using FIG. 3 in the process of inference. More specifically, as shown in FIG. 4, the inference apparatus 10 includes therein an input layer execution part 11 that realizes the input layer, an intermediate layer execution part 12 that realizes the intermediate layer, and an output layer execution part 13 that realizes the output layer. Further, the intermediate layer execution part 12 includes a convolutional layer execution section 31 that realizes the convolutional layer, an activation function execution section 32 that executes the activation function, and a pooling layer execution section 33 that realizes the pooling layer in each layer (refer to FIG. 5). In the disclosure of the present application, the convolutional layer execution section 31, out of each execution part/section shown in FIGS. 4 and 5, will be described in detail. Since the other execution parts/sections can be implemented using known algorithms, etc., the explanations will be omitted.

The convolutional layer execution section 31 in each layer executes the convolution operation (multiplication/addition processing) described with reference to FIG. 3 using a plurality of processing elements (PEs).

Figure 6:
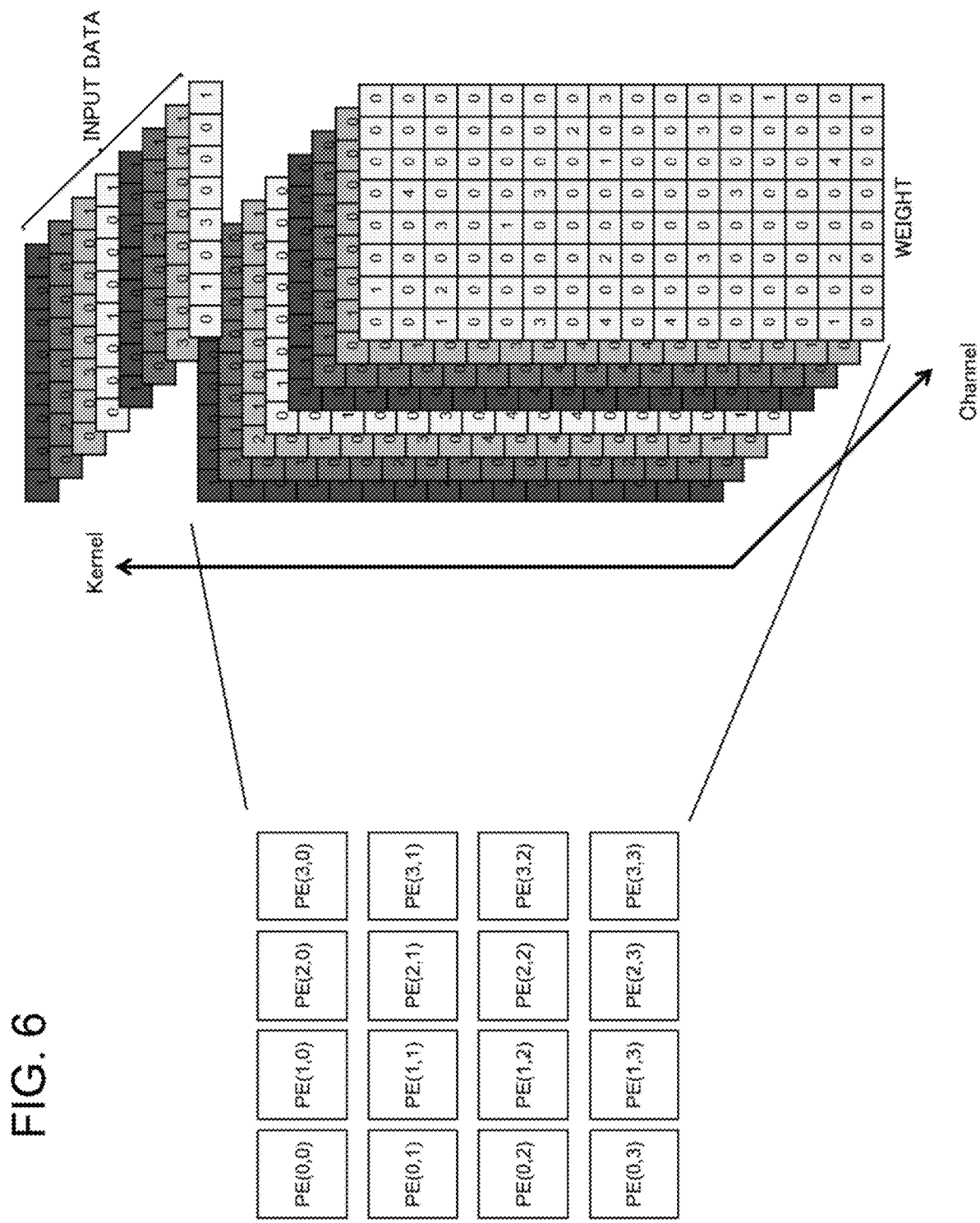
FIG. 6 is a drawing for explaining the operation of PEs included in a convolutional layer execution section relating to the first exemplary embodiment.

FIG. 6 is a drawing for explaining the operation of the PEs included in the convolutional layer execution section 31. FIG. 6 shows an example in which the number of input channels C is "8" and the number of output channels K is "16." Further, the size of a weight is 8 (for instance S=2, R=4). In addition, input data and weights are shown in a one-dimensional array (vector) in FIG. 6. Therefore, each row of weights represents a different weight group in FIG. 6 (the upper and lower rows show different weight groups in the example of FIG. 3). Further, in FIG. 6, different shades assigned to the input data and the weights indicate associations between them. For instance, the backmost input data in the darkest shade is associated with the backmost weights in the same shade. As described above, multiplication and addition processing is performed on corresponding input data and weights. More concretely, multiplication and addition processing is executed in the channel direction on input data and the corresponding weight group using a plurality of PEs.

In the example shown in FIG. 6, since the number of input channels C is "8" and the number of weight groups (the number of output channels K) is "16," multiplication operations between the input data and the weights are executed 128 (8×16) times. Then addition in the channel direction is executed. The convolutional layer execution section 31 executes the convolution operation including the multiplication operations (128 times in the above example) using a plurality of PEs. The following description assumes that the convolutional layer execution section 31 executes the convolution operation using sixteen PEs as shown in FIG. 6. It goes without saying that the number of PEs is not limited to sixteen.

The convolutional layer execution section 31 executes in parallel the convolution operation (multiplication/addition) relating to a plurality of weight groups and a plurality of weights included in the weight groups using a plurality of PEs. For instance, in the example of FIG. 6, the convolutional layer execution section 31 processes in parallel four channels of weights from eight channels included in each weight group. Further, the convolutional layer execution section 31 processes in parallel four weight groups from sixteen weight groups.

With respect to parallel processing in the channel direction, for instance, PEs (0, 0) to (3, 0) process (start processing) in parallel up to the fourth weights from the back in the first rows in FIG. 6. Further, each PE sequentially executes the convolution operation using the input data and the weights in every four channels (in the above example; this number corresponds to the number of channels processed in parallel). For instance, in the example shown in FIG. 6, the PE (0, 0) executes the convolution operation with respect to the fifth weight from the back, out of the weights included in the weight groups in the first rows (the top rows), after processing the backmost weight.

With respect to allocation in the kernel direction, for instance, PEs (0, 0) to (0, 3) process (start processing) in parallel the weights in the first to the fourth rows, out of the backmost weights shown in FIG. 6. Further, each PE sequentially executes the convolution operation using the weights included in every four weight groups (in the above example; this number corresponds to the number of weight groups processed in parallel) in the corresponding channels. For instance, in the example shown in FIG. 6, the PE (0, 0) executes the convolution operation using the weights in the first, fifth, ninth, and thirteenth rows of the backmost weights while the PE (0, 1) executes the convolution operation using the weights in the second, sixth, tenth, and fourteenth rows of the backmost weights.

Figure 7:
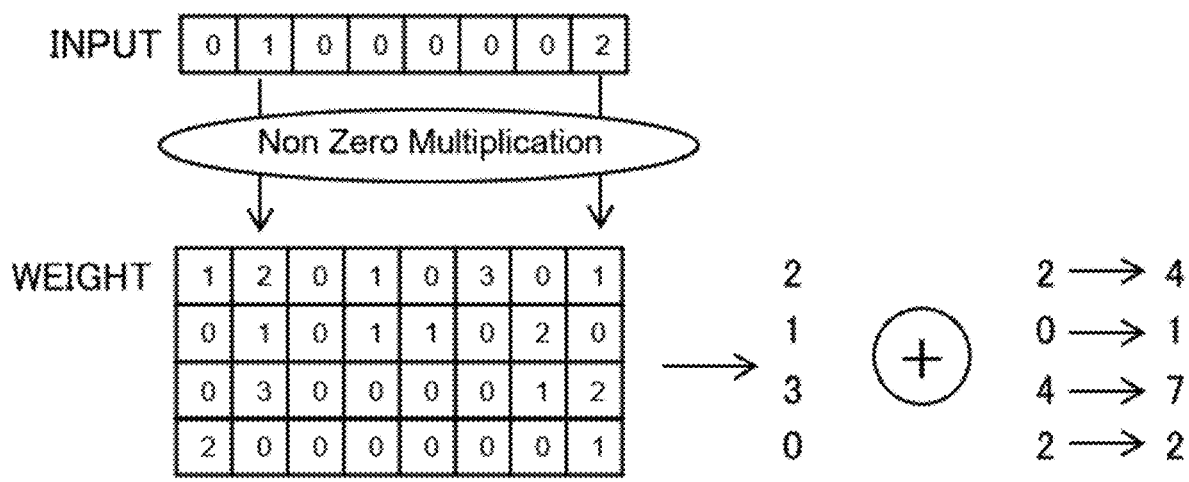
FIG. 7 is a drawing for explaining computation executed by each PE.

FIG. 7 is a drawing for explaining computation executed by each PE. First, each PE identifies an element having a non-zero element value (referred to as a non-zero element hereinafter) and the index thereof in input data. For instance, in the example of FIG. 7, "1" is identified as a non-zero element and "1" as the index thereof.

Then each PE performs multiplication processing on the weight element corresponding to the index of a non-zero element and the non-zero element in the input data. The multiplication processing is sequentially performed in the kernel direction (processed in order). In the example of FIG. 7, "1" in the input data and elements (2, 1, 3, 0) in the second column of the weights are sequentially multiplied, and the results are stored in a primary storage area.

When the multiplication processing on the first non-zero element is completed, a next non-zero element in the input data and the index thereof are identified. In the example of FIG. 7, "2" is identified as a non-zero element and "7" as the index thereof. Then, as above, the non-zero element "2" and elements (1, 0, 2, 1) in the eighth column of the weights are sequentially multiplied, and the results are stored in the primary storage area. The results of multiplication between the non-zero elements and the weights are added for each weight group, creating output data of each PE. In the example of FIG. 7, "4" and "1" are outputted as the results with respect to the weight groups in the first and second rows, respectively.

As described above, in the convolution operation, each PE executes the multiplication processing on the input data and the weights, and the addition processing for each weight group. The computation result (the addition result for each weight group) in each PE is further added to each other in the channel direction, and the final process of the convolution operation is completed. In other words, the input data and the weights are multiplied, and then the results are added for each weight group (the weight direction, i.e., the direction of S and R; the weight row direction in the example of FIG. 6) in the convolution operation in the convolutional layer. Then the addition results for all the weight groups are added in the channel direction.

Figure 8:
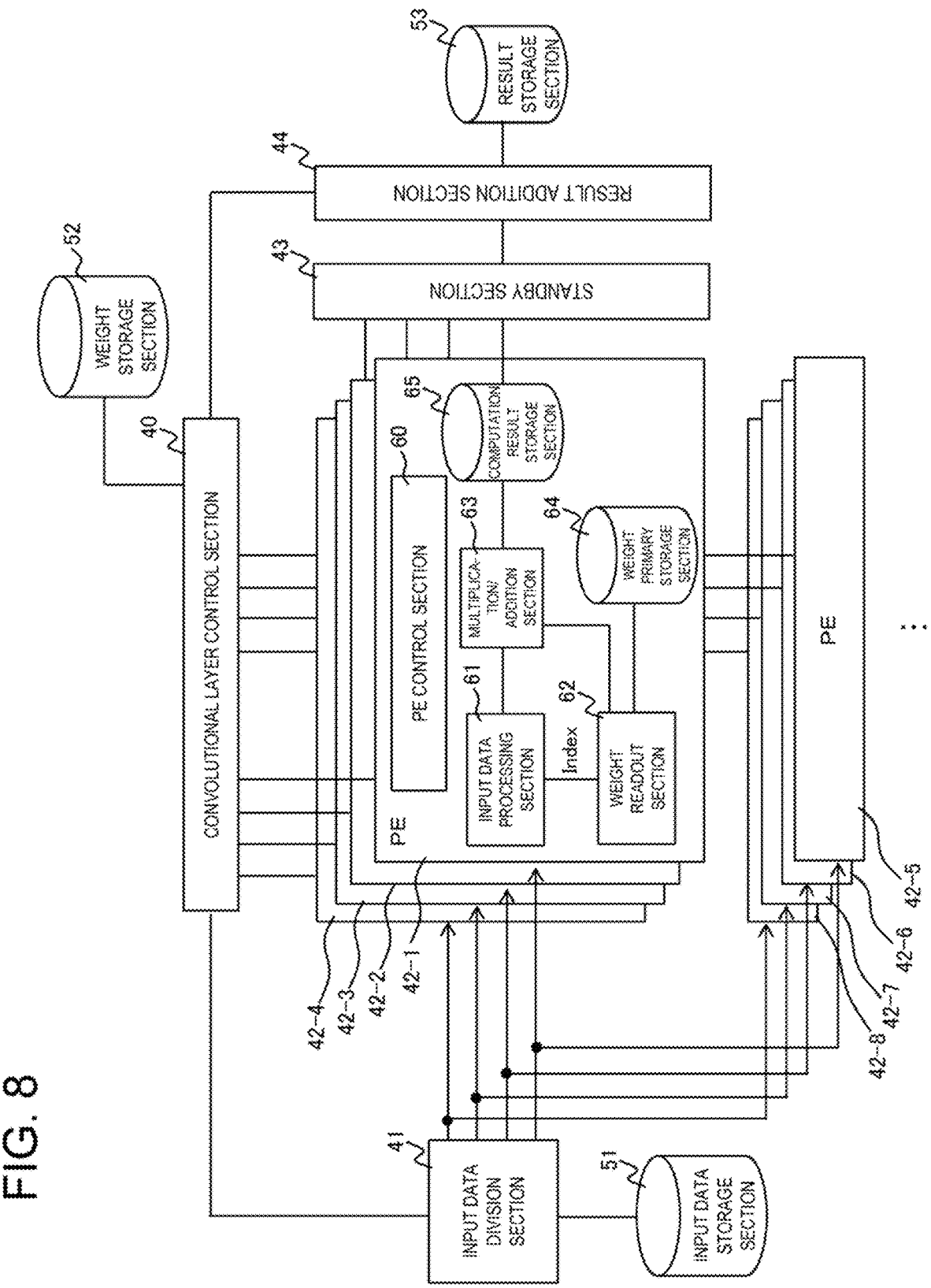
FIG. 8 is a drawing illustrating an example of an internal configuration of the convolutional layer execution section relating to the first exemplary embodiment.

FIG. 8 is a drawing illustrating an example of an internal configuration of the convolutional layer execution section 31. With reference to FIG. 8, the convolutional layer execution section 31 includes a convolutional layer control section 40, an input data division section 41, a plurality of PEs 42-1 to 42-8, a standby section 43, a result addition section 44, and various storage sections, which include an input data storage section 51, a weight storage section 52, and a result storage section 53. In the following description, when there is no particular reason to distinguish the PEs 42-1 to 42-8, they are simply referred to as "PEs 42."

As described, the convolutional layer execution section 31 includes a plurality of PEs 42. The plurality of PEs 42 are managed in units that perform the convolution operation in parallel in the channel direction. In the example of FIG. 8, a set of the PEs 42 (PEs 42-1 to 42-4) executes the convolution operation in parallel in the channel direction. Similarly, another set of the PEs 42 (PEs 42-5 to 42-8) executes the convolution operation in parallel in the channel direction. Each PE 42 executes computation that includes multiplication of a piece of input data by a weight. Further, each PE 42 executes the multiplication processing included in the convolution operation while excluding elements whose values are zero from each piece of the input data.

The input data division section 41 is connected to each of the plurality of PEs 42. Similarly, the convolutional layer control section 40 is connected to each of the plurality of PEs 42. The standby section 43 is provided for each set of the PEs 42 that perform the convolution operation in parallel in the channel direction. In the example of FIG. 8, each of the PEs 42-1 to 42-4 is connected to the standby section 43. The standby section 43 is connected to the result addition section 44. Note that FIG. 8 omits a standby section that corresponds to the PEs 42-5 to 42-8 and a result addition section connected to this standby section.

The convolutional layer control section 40 is means for controlling the entire convolutional layer. The convolutional layer control section 40 operates the convolution operation in a convolutional neural network using each piece of the input data and a weight group including a plurality of weights that correspond to each piece of the input data by controlling the plurality of PEs 42.

More specifically, the convolutional layer control section 40 controls the plurality of PEs 42 so that, out of the multiplication operations of all the pieces of the input data (all the pieces of the input data of a plurality of channels) by the weights, each corresponding to each piece of the input data, some operations are executed in parallel. For instance, in FIG. 6, the convolutional layer control section 40 controls each PE 42 so that the convolution operation (including multiplication) on four channels of the input data and the corresponding weights is executed in parallel.

Further, the convolutional layer control section 40 controls the plurality of PEs 42 so that, out of the multiplication operations of all the pieces of the input data (all the pieces of the input data of a plurality of channels) by the weights included in a plurality of weight groups, some of operations using weights belonging to different weight groups, but corresponding to the same input data are executed in parallel. For instance, in FIG. 6, the convolutional layer control section 40 controls each PE 42 so that the convolution operation (including multiplication) on the first row of the backmost weights and the corresponding backmost input data and the convolution operation on the second row of the backmost weights and the corresponding backmost input data are executed in parallel.

Further, the convolutional layer control section 40 exchanges control information with control modules in other layers and realizes the function of the entire inference apparatus 10. More specifically, when receiving a notification from the preceding layer that a convolution operation has been completed, the convolutional layer control section 40 controls the PEs 42 managed thereby and executes an convolution operation (controls the PEs 42 to execute the convolution operation). Further, the convolutional layer control section 40 notifies the subsequent layer of the completion of the convolution operation in the layer thereof.

The weights used in the convolution operation in each layer are stored in the weight storage section 52. The weights stored in the weight storage section 52 may be set before the inference apparatus 10 starts to operate or may be provided as necessary by a higher-level apparatus (such as a learning apparatus) and stored in the weight storage section 52. For instance, data relating to the weights shown in FIG. 6 is stored in the weight storage section 52.

The convolutional layer control section 40 reads out weights from the weight storage section 52 and distributes necessary weights (data) to each PE 42. For instance, when the PE 42-4 in FIG. 8 corresponds to the PE (0, 0) in FIG. 6, the convolutional layer control section 40 distributes to the PE 42-4 the weights in the first, fifth, ninth, and thirteenth rows of the backmost weights and the weights in the first, fifth, ninth, and thirteenth rows of the fifth weights from the back shown in FIG. 6.

The input data storage section 51 stores input data (output data from the preceding layer).

The input data division section 41 reads input data from the input data storage section 51 according to an instruction from the convolutional layer control section 40. Specifically, the convolutional layer control section 40 specifies the size and position of the input data extracted from the entire input data, and instructs the input data division section 41 to read the specified data.

The input data division section 41 supplies the data read according to the instruction to each PE 42. More specifically, the input data division section 41 divides a plurality of pieces of input data (including a plurality of channels) and supplies the divided pieces of input data to the PE 42 that performs parallel multiplication. In other words, the input data division section 41 divides and supplies the read data for each PE 42. For instance, when the number of channels processed in parallel (the number of the PEs 42 that process the weights in parallel in the channel direction) is "4" as shown in FIG. 6, the input data division section 41 divides the input data into four segments and supplies each segment of the input data to each PE 42. In the example shown in FIG. 6, eight pieces of input data are divided by four (as indicated by the shades assigned to the input data in FIG. 6), each of four segments of the input data is supplied to each PE 42. For instance, to the PE (0, 0) shown in FIG. 6, two segments, the backmost segment of the input data and the fifth segment of the input data from the back (both in the darkest shade), are supplied. Note that the same input data is supplied to the PEs 42 having the same corresponding channel. For instance, the same input data is supplied to the PE 42-1 and the PE 42-5 in FIG. 8. Similarly, the same input data is supplied to the PE 42-2 and the PE 42-6.

Each PE 42 includes a PE control section 60, an input data processing section 61, a weight readout section 62, a multiplication/addition section 63, a weight primary storage section 64, and a computation result storage section 65.

The input data processing section 61 acquires the input data outputted by the input data division section 41. The PE control section 60 acquires the weights distributed by the convolutional layer control section 40 and stores the acquired weights in the weight primary storage section 64.

The PEs 42 execute the convolution operation using the weights (the distributed weights) stored in the weight primary storage section 64 and the input data acquired from the input data division section 41. More specifically, the PEs 42 execute the processes described using FIG. 7, i.e., the multiplication between the input data and the corresponding weights and the addition process for each weight group.

The input data processing section 61 identifies a non-zero element having a non-zero value in the received input data and the position of the non-zero element. More specifically, the input data processing section 61 extracts a non-zero element and the corresponding index from the input data. The input data processing section 61 hands over the extracted index to the weight readout section 62. Further, the input data processing section 61 hands over the non-zero element to the multiplication/addition section 63.

Out of the weight elements to be multiplied by the input data, the weight readout section 62 reads a value at the position corresponding to the position (index) of the non-zero element from the storage medium that stores the weight groups. More specifically, the weight readout section 62 sequentially reads the weight elements corresponding to the acquired indexes from the weight primary storage section 64. The weight readout section 62 hands the read values to the multiplication/addition section 63.

The multiplication/addition section 63 multiplies the non-zero element by the value read by the weight readout section 62. More specifically, the multiplication/addition section 63 multiplies the non-zero element acquired from the input data processing section 61 by the weight element acquired from the weight readout section 62. The multiplication/addition section 63 saves the multiplication result in a primary storage area such as a register.

The input data processing section 61, the weight readout section 62, and the multiplication/addition section 63 repeat the processes described above. When all the non-zero elements from the input data have been processed, the input data processing section 61 notifies the multiplication/addition section 63 thereof. Upon receiving this notification, the multiplication/addition section 63 adds the multiplication results for each weight group and stores the addition results in the computation result storage section 65. In other words, when the multiplication with respect to the non-zero elements included in the input data is completed, the multiplication/addition section 63 adds up the multiplication results.

When the computation results are stored in the computation result storage section 65, the PE control section 60 determines whether or not any piece of the input data supplied by the input data division section 41 remains unprocessed. If unprocessed input data exists, the PE control section 60 controls the input data processing section 61, etc., and executes the multiplication/addition processing described above with respect to the unprocessed input data. For instance, in the case where the backmost segment of the input data and the fifth segment of the input data from the back are supplied to the PE (0, 0) shown in FIG. 6, the PE control section 60 controls the input data processing section 61, etc., so that, after the multiplication/addition processing on the first segment of the input data (for instance the backmost segment) is completed, the multiplication/addition processing on the next segment of the input data (for instance the fifth segment from the back) is executed. In other words, after completing the convolution operation with respect to a piece of the input data, each PE 42 sequentially executes the convolution operation on another piece of the input data.

After completing the convolution operation on this piece of the input data (the second piece of the input data), the PE control section 60 adds the computation results from the second piece of the input data to the computation results from the first piece of the input data in the channel direction, and stores the results in the computation result storage section 65.

When the convolution operations with respect to all the pieces of the input data have been completed and the results thereof are stored in the computation result storage section 65, the PE control section 60 notifies the standby section 43 thereof.

The standby section 43 is means for standing by until the completion of the computations by all of the plurality of PEs 42 that process the weights in parallel in the channel direction. When acquiring the notifications (that the computation results have been stored) from all the connected PEs 42, the standby section 43 stops standing by, reads the computation results from the computation result storage section 65 of each PE 42, and hands over the data to the result addition section 44.

The result addition section 44 is means for adding the results of multiplying each piece of the input data by a plurality of weights included in a weight group. These addition results correspond to the addition of the computation results in channel direction.

The result addition section 44 stores the addition results in the result storage section 53 and notifies the convolutional layer control section 40 thereof.

When the convolutional layer control section 40 acquires the notifications (that the addition results have been stored in the result storage section 53) from all the result addition sections 44, the convolutional layer control section 40 determines that the computation in the layer thereof has been completed, and notifies the subsequent layer (the activation function) thereof.

As described above, the inference apparatus 10 according to the first exemplary embodiment multiplies only non-zero elements of the input data by each element of the weights in the computation of the convolutional layer. This reduces the number of multiplication operations executed in the convolutional layer. For instance, the example of FIG. 7 originally required thirty-two multiplication operations (4×8=32), but this is reduced to eight (2 (the number of non-zero elements)×4=8).

Exemplary Embodiment 2

A second exemplary embodiment will be described in detail with reference to the drawings.

The inference apparatus 10 relating to the first exemplary embodiment reduces the number of multiplication operations performed in the convolutional layer. Reducing the number of multiplication operations, however, may increase the scale of hardware. More specifically, the increased size of the computation result storage section 65 becomes an issue.

For instance, when the number of output channels K (the number of weight groups) is "16" and the number of PEs that perform parallel processing in the kernel direction (the number of items processed in parallel in the kernel direction; N) is "4," each PE 42 must temporarily hold addition results with respect to four types of weight groups (K/N=16/4=4). For instance, with reference to FIG. 7, four sets of addition results with respect to four rows of the weight groups must be temporarily held. The computation result storage section 65 in each PE 42 needs to have at least this size (capacity).

The number of PEs 42 included in a single convolutional layer is obtained by multiplying the number of PEs 42 that perform parallel processing in the channel direction (the number of items processed in parallel in the channel direction; M) by the number of PEs 42 that perform parallel processing in the kernel direction (N) (=M×N). Therefore, the size of the required storage medium (memory) can be obtained by multiplying the total number of PEs 42 (M×N) by the size of the computation result storage section 65 of each PE 42 (K/N) (=M×K). In the second exemplary embodiment, the inference apparatus 10 comprising a computation result storage section 65 having a size smaller than the one above (M×K) will be described.

Figure 9:
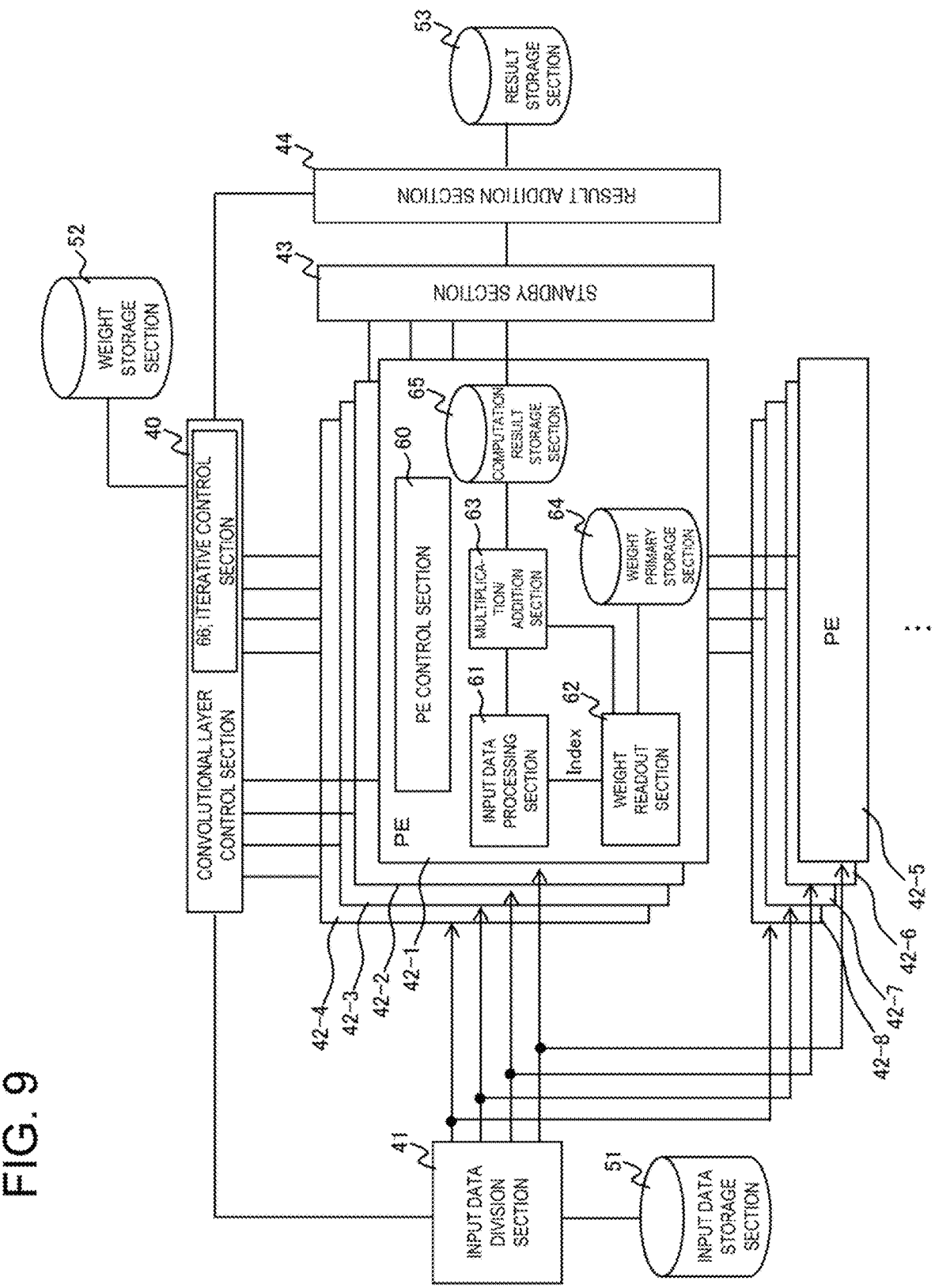
FIG. 9 is a drawing illustrating an example of an internal configuration of a convolutional layer execution section relating to a second exemplary embodiment.

FIG. 9 is a drawing illustrating an example of an internal configuration of a convolutional layer execution section 31 relating to the second exemplary embodiment. With reference to FIGS. 8 and 9, the second exemplary embodiment differs from the first exemplary embodiment in that the convolutional layer control section 40 includes an iterative control section 66 therein.

The convolutional layer control section 40 relating to the second exemplary embodiment controls each PE 42 to execute multiplication processing in time division in the kernel direction. For instance, in the case of FIG. 7 where a single PE 42 executes multiplication processing on four weight groups, the iterative control section 66, a submodule of the convolutional layer control section 40, controls each PE 42 to execute multiplication processing and subsequent addition processing on the first and second rows from the top shown in FIG. 7.

After completing the processing on the two rows, each PE 42 stores the computation results in the computation result storage section 65. Once the computation results have been stored, the PE control section 60 of each PE 42 notifies the standby section 43 thereof. Upon receiving the notification, the standby section 43 reads the computation results from the computation result storage section 65 of each PE 42, and hands over the computation results to the result addition section 44. The result addition section 44 acquires the computation results from the standby section 43 and temporarily stores the acquired results in the result storage section 53. At this time, if there are some results already stored in the result storage section 53, the result addition section 44 adds the acquired computation results to these existing stored results. Once the computation results are stored in the result storage section 53, the result addition section 44 notifies the iterative control section 66 thereof.

The iterative control section 66 controls each PE 42 to execute the remaining time-divided processing (for instance processing with respect to the weight groups in the third and fourth rows from the top in FIG. 7). More specifically, the iterative control section 66 instructs the PE control section 60 of each PE 42 to execute the remaining time-divided processing. Each PE 42 executes the remaining time-divided processing. Each PE 42, the standby section 43, the result addition section 44, and the iterative control section 66 repeat the operation described above until there is no remaining time-divided processing. Thus, the results of computation by each PE 42 are stored in the result storage section 53. Each time computation results are received from each PE, the result addition section 44 reads the corresponding computation results (the results from other PEs 42) stored in the result storage section 53. Then, the result addition section 44 performs the addition of the computation results in the channel direction by adding the acquired computation results to these read computation results.

After the convolution operation processing time-divided in the kernel direction has been completed, the convolutional layer control section 40 operates as in the first exemplary embodiment.

As described, the inference apparatus 10 relating to the second exemplary embodiment causes each of a plurality of PEs 42 to execute a plurality of processes of multiplying a piece of input data by weights included in different weight groups in time division. In other words, the inference apparatus 10 relating to the second exemplary embodiment time-divides the convolution operation processing in each PE 42 in the kernel direction. This will reduce the required size of the computation result storage section 65 of each PE 42. More specifically, in the example of FIG. 7, the computation result storage section 65 must have a capacity that can hold four computation results in the first exemplary embodiment. In the second exemplary embodiment, however, since the computation results are stored in (moved to) the result storage section 53 each time a time-divided process is completed, the computation result storage section 65 only needs to have a capacity that can hold two computation results.

The above effect is generalized as follows. In a case where each PE 42 needs to process K/N weights and T (<K/N) weights are processed in a time-divided process, the size (capacity) of the computation result storage section 65 in each PE 42 is K/N in the first exemplary embodiment, whereas it is T in the second exemplary embodiment. Further, the overall size of the computation result storage sections 65 required for an entire convolutional layer is K×M in the first exemplary embodiment, whereas it is T×M×N in the second exemplary embodiment. Since T is smaller than K/N as stated above, the following holds: T×N×M<K×M.

For instance, when C=512, K=512, N=64, M=64, and T=4, a storage medium (memory) that can hold 32,768 (=512×64) items of computation results is required in the first exemplary embodiment (no time-division processing), whereas the second exemplary embodiment (with time division) requires a storage medium that can hold 16,384 (=4×64×64) items of computation results.

Exemplary Embodiment 3

A third exemplary embodiment will be described in detail with reference to the drawings.

In the first and the second exemplary embodiments, a plurality of PEs 42 process weights in parallel in the channel and kernel directions. Each PE 42 multiplies non-zero elements included in input data by weights. Then, after the processing by other PEs computing in parallel has been completed, addition in the channel direction is performed. Since non-zero elements included in input data are multiplied by weights, the PEs 42 may complete the computation at different times if the number of non-zero elements in input data supplied to each PE 42 is not consistent. In other words, if the number of non-zero elements included in input data supplied to each PE 42 is discrepant, the execution time will vary between the PEs 42. If the execution time is inconsistent among the PEs 42, the computation processing in the convolutional layer will be restricted by the longest execution time of the PEs 42 since it will be necessary to wait for the PE 42 with the longest execution time to finish the processing thereof (the PE 42 with the longest execution time will bottleneck the entire processing). Note that non-zero elements included in input data (i.e., output data from the preceding layer) are also referred to as activation sparsity. In other words, discrepancy in activation sparsity causes discrepancy in the execution time of the PEs 42.

In the third exemplary embodiment, the inference apparatus 10 that minimizes the effects of this bottleneck will be described.

Figures 10A, 10B:
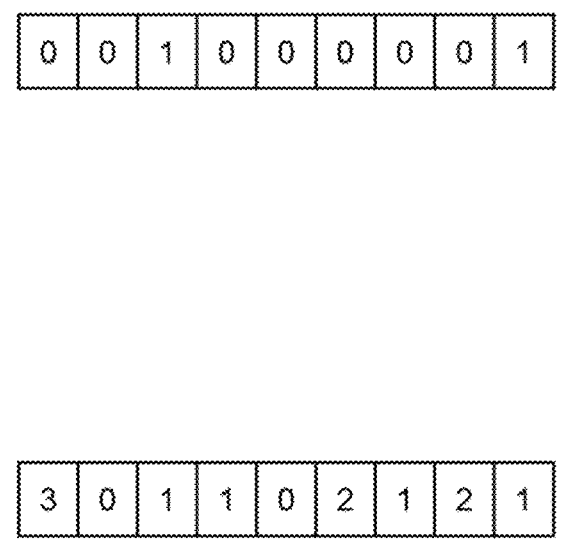

First, with reference to FIGS. 10A and 10B, a description will be given about the fact that different data supplied to each PE 42 requires a different time for computation. FIGS. 10A and 10B are drawings showing two different pieces of input data supplied to the PEs 42.

Since there are only two non-zero elements in FIG. 10A, the processing results are obtained relatively quickly, however, FIG. 10B has seven non-zero elements and it takes more time to obtain the processing result. For instance, in case where the two pieces of input data shown in FIGS. 10A and 10B are supplied to different PEs 42 and processed in parallel, the PE 42 that processes the input data of FIG. 10A stands by until the PE 42 that processes the input data of FIG. 10B finishes the computation. In other words, the PE 42 that processes the input data of FIG. 10B becomes a bottleneck in the convolution operation. Further, since other PEs 42 stand by until the computation by the PE that processes the input data shown in FIG. 10B is completed, the resources are not utilized effectively.

In order to solve these problems (a slow-processing PE being a bottleneck and efficient utilization of the resources being impeded), weight groups are rearranged in the kernel direction in the third exemplary embodiment. The following describes how these problems are solved by rearranging weight groups in the kernel direction. Note that, in the disclosure of the present application, rearranging weight groups means changing the order (computation order) of the weight groups multiplied by the input data. For instance, in FIG. 3, instead of multiplying the weight group 511 and then the weight group 512 by the input data, first the weight group 512 and then the weight group 511 are multiplied by the input data. This is what "rearranging weight groups in the kernel direction" entails. "Rearranging weight groups in the kernel direction" also involves changing the arrangement in the memory that stores the weight groups in order to change the computation order of the weight groups. In other words, the rearrangement of the weight groups may be achieved by changing the operation of the processor (the convolutional layer control section) that reads the weight groups by accessing the memory or changing the arrangement in the memory without changing the operation of the processor.

Figure 11:
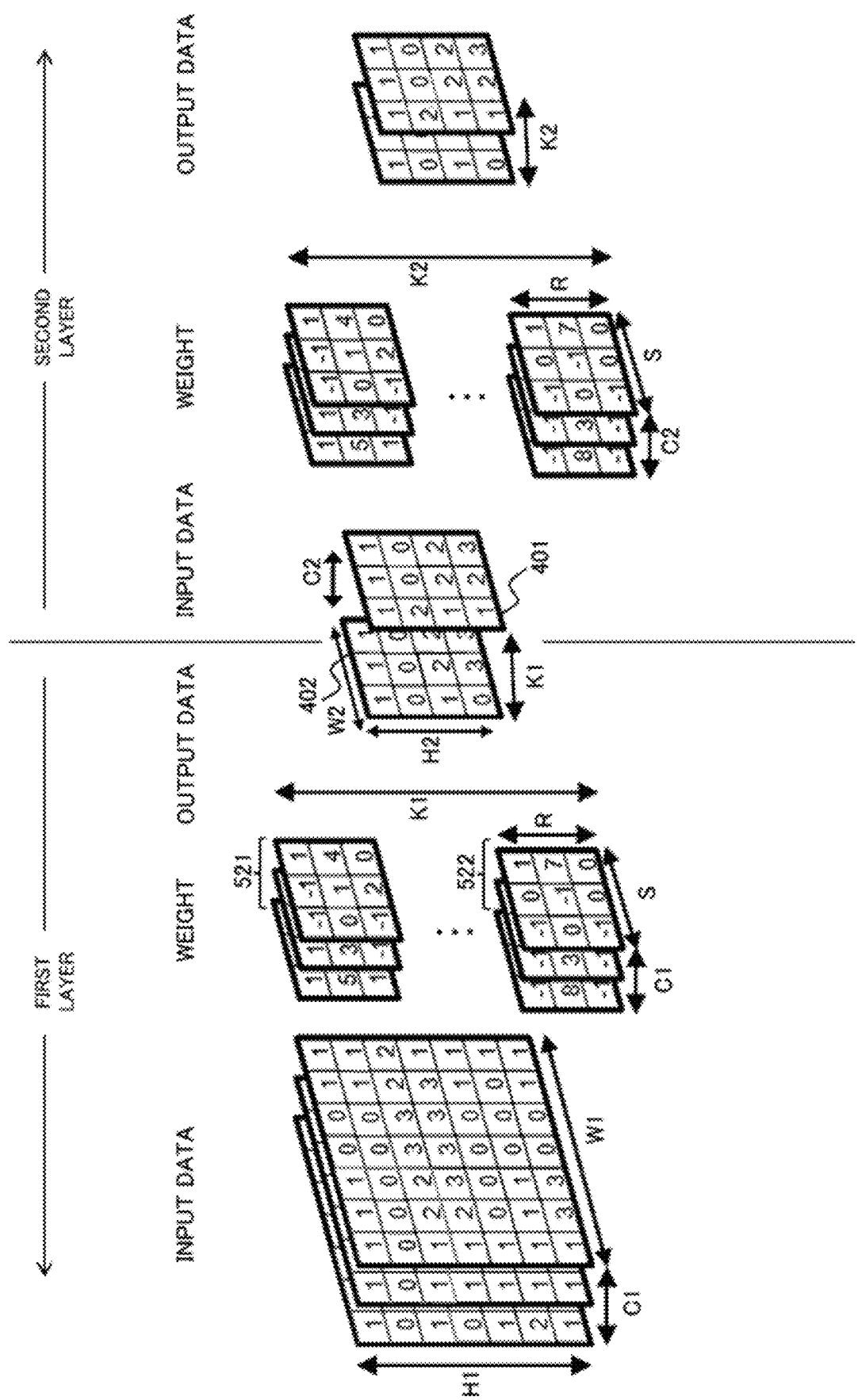
FIG. 11 is a drawing for explaining a problem solution according to a third exemplary embodiment.

FIG. 11 is a drawing for explaining a problem solution according to the third exemplary embodiment. Note that the parameters changed by the operation of the pooling layer (before and after pooling) are the size W and H of input data. In other words, the parameters related to weights (the size R and S of weights), the number of input channels C, and the number of output channels K do not change after pooling. In the example of FIG. 11, the size R and S of weights, the number of input channels C2, and the number of output channels K2 in the second layer do not change after pooling. Note that, as stated above, the pooling process does change the size W and H of input data and this is illustrated in FIG. 11. Therefore, FIG. 11 implicitly assumes the application of the pooling layer.

As described above, the problems are caused by discrepancy (variation) in activation sparsity. In the example of FIG. 11, if there is a significant difference in activation sparsity between data 401 and 402 supplied as input in the second layer, the processing times of convolution operations using the data 401 and 402 in the second layer may differ greatly.

As shown in FIG. 11, the input data of the second layer is the output data from the preceding layer (the first layer). Therefore, discrepancy in activation sparsity in the output data of the first layer affects the computation (the execution time) in the second layer.

Note that the output data from each layer is obtained by applying an activation function (for instance ReLU function). In the ReLU function, negative values are replaced with "0" and positive values are outputted as they are. Therefore, the more negative values in the data supplied to the activation function, the more zeros the data supplied to the subsequent layer is likely to include. Conversely, the more positive values in the data supplied to the activation function, the less zeros the data supplied to the subsequent layer is likely to include. Further, due to the characteristics of the activation function, no negative value is included in the input data supplied to each layer.

The convolution operation determines whether the data supplied to the activation function is positive or negative. Since the convolution operation is affected by both input data and weights, the computation results are more likely to be negative when there are many negative values among the weight elements. In other words, the more negative values included in the weights, the more zeros the output of the subsequent layer is likely to include after application of the activation function, and the more positive values included in the weights, the more non-zero elements the output of the subsequent layer is likely to include after application of the activation function.

As described above, significant discrepancy in activation sparsity will result in discrepancy in the processing time of the convolution operation. In order to minimize discrepancy in activation sparsity in the input in the second layer, i.e., the output in the first layer, the weight groups in the first layer are rearranged in the third exemplary embodiment. More specifically, the weight groups in the first layer are rearranged in order to minimize variation in activation sparsity among adjacent items in the output data in the first layer. In other words, the computation order of the weight groups are rearranged in the kernel direction.

For instance, the total number of negative values included in each of the weight groups arranged in the kernel direction is calculated as an evaluation criterion, and the weights are rearranged in descending or ascending order according to the evaluation criterion. Note that rearranging the weight groups in the preceding layer (first layer) changes the order of items of the output data of the first layer. For instance, let us assume that the output data that corresponds to a weight group 521 is the data 401, and the output data that corresponds to a weight group 522 is the data 402 in FIG. 11. If the order of the weight groups 521 and 522 is swapped, the data 402 will come before the data 401 in the output data of the first layer. Since the weights (weights in the channel direction) included in the weight groups in each layer are provided in association with the channels of the input data, changing the order of items of the output data in the preceding layer affects the associations with the input data in the subsequent layer. Therefore, in order to adapt to the input data with a changed order, the order of the weights included in the weight groups in the channel direction in each layer must be changed (the associations with the input data must be changed).

Figure 12:
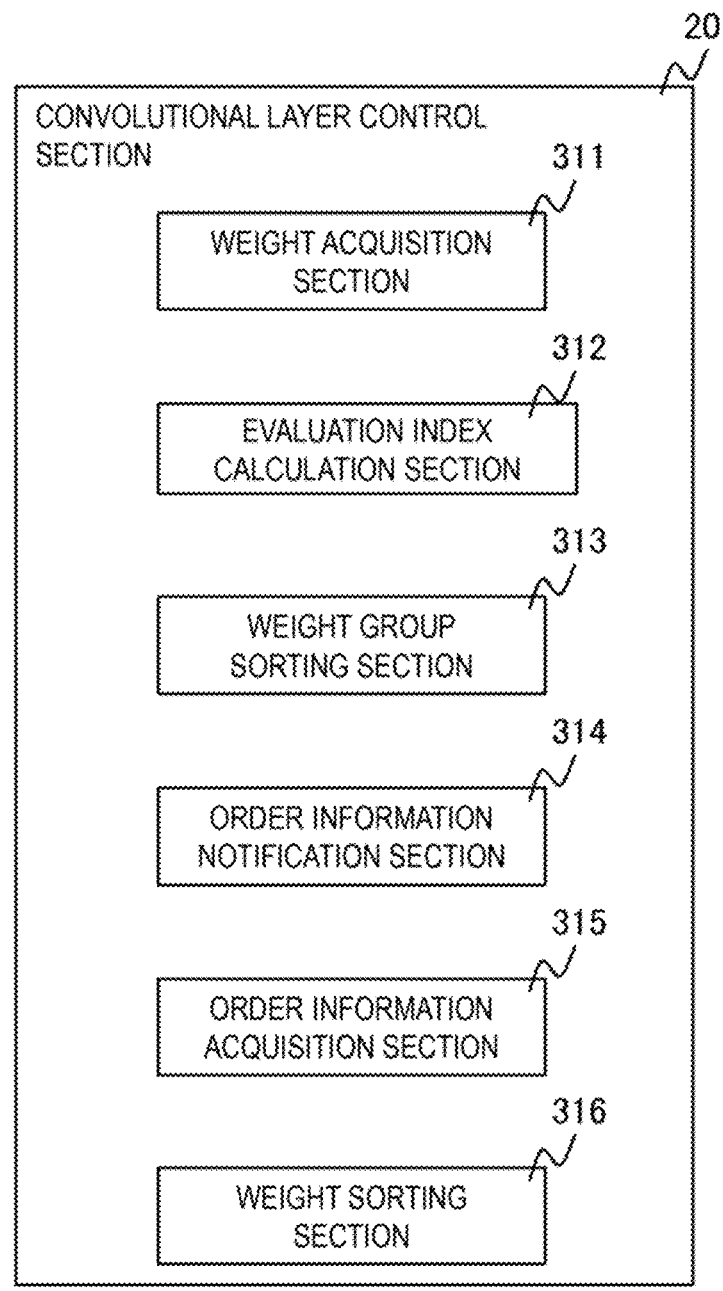
FIG. 12 is a drawing illustrating an example of an internal configuration of a convolutional layer control section relating to the third exemplary embodiment.

FIG. 12 is a drawing illustrating an example of an internal configuration of the convolutional layer control section 40 relating to the third exemplary embodiment. With reference to FIG. 12, the convolutional layer control section 40 is configured to include a weight acquisition section 311, an evaluation index calculation section 312, a weight group sorting section 313, an order information notification section 314, an order information acquisition section 315, and a weight sorting section 316.

The weight acquisition section 311 is means for reading a weight from the weight storage section 52. The read weight is handed over to the evaluation index calculation section 312.

Figures 13A, 13B:
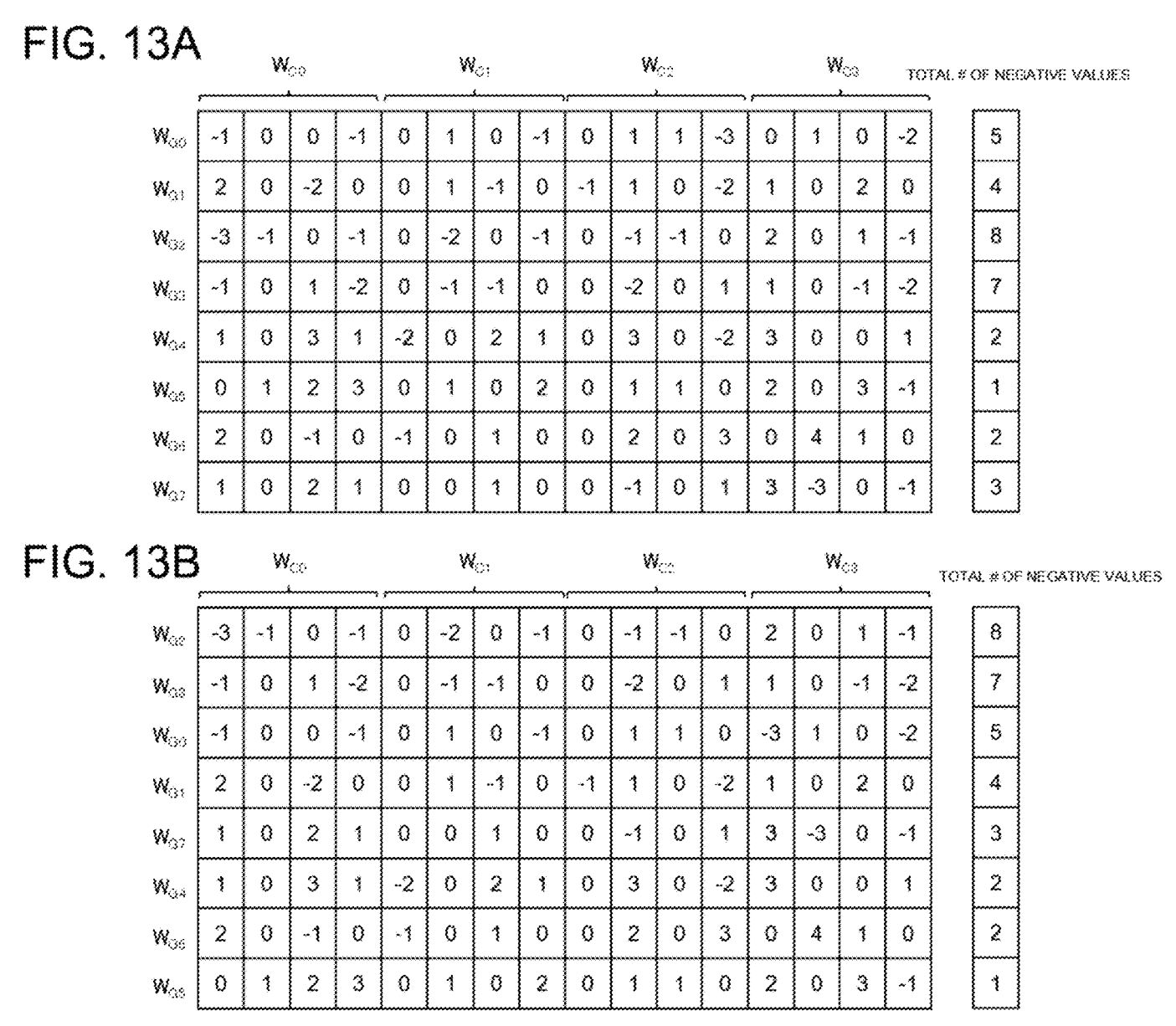

The evaluation index calculation section 312 is means for calculating an evaluation index for evaluation a weight group. This evaluation index is used for rearranging weight groups. FIGS. 13A and 13B are drawings for explaining the operation of the convolutional layer control section 40 relating to the third exemplary embodiment. FIGS. 13A and 13B show eight weight groups $W_{G0}$ to $W_{G7}$. Further, each weight group includes four channels of weights. The size of weights corresponding to each channel is 2×2=4. FIGS. 13A and 13B show the weights corresponding to each channel as $W_{C0}$ to $W_{C3}$. In other words, each row shown in FIGS. 13A and 13B indicate weight group in the kernel direction, and each weight group includes four weights in the channel direction.

FIG. 13A shows the weights immediately after they were acquired by the evaluation index calculation section 312, which calculates the total number of negative values in each weight group. For instance, in FIG. 13A, the total number of negative values in the weight group $W_{G0}$ is "5," and the total number of negative values in the weight group $W_{G1}$ is "4."

The weight group sorting section 313 is means for sorting the weight groups to be multiplied by the input data in the kernel direction on the basis of the calculate evaluation indexes. For instance, the weight group sorting section 313 sorts the weight groups so that the evaluation indexes are in descending order. FIG. 13B shows the results of sorting the weights (weight groups) shown in FIG. 13A so that the evaluation indexes are in descending order.

After the weight groups are sorted by the weight group sorting section 313, the convolutional layer control section 40 operates identically to those in the first and the second exemplary embodiments. More specifically, the convolutional layer control section 40 assigns the weights to each PE 42, and once each PE 42 completes the convolution operation, the convolutional layer control section 40 notifies the convolutional layer control section 40 of the subsequent layer thereof.

The order information notification section 314 is means for notifying other layers of order information regarding the sorting of the weight groups by the weight group sorting section 313. More specifically, the order information notification section 314 notifies the order information to the convolutional layer control section 40 of the subsequent layer. In the example of FIGS. 13A and 13B, the order information notification section 314 notifies the weight group order of $W_{G2}$, $W_{G3}$, $W_{G0}$, $W_{G1}$, $W_{G7}$, $W_{G4}$, $W_{G6}$, and $W_{G5}$ to the convolutional layer control section 40 of the subsequent layer.

The order information acquisition section 315 is means for acquiring the order information regarding the sorting of the weight groups from the convolutional layer control section 40 of the preceding layer.

The weight sorting section 316 is means for changing the associations between the input data and the weights included in the weight groups on the basis of the acquired order information. More specifically, the weight sorting section 316 rearranges the weights included in the weight groups in the layer thereof in the channel direction on the basis of the order information acquired from the convolutional layer control section 40 of the preceding layer. In the example of FIGS. 13A and 13B, the weights included in each weight group are sorted in the order of $W_{G2}$, $W_{G3}$, $W_{G0}$, $W_{G1}$, $W_{G7}$, $W_{G4}$, $W_{G6}$, and $W_{G5}$ in the channel direction. The weight sorting section 316 reads the weights from the weight storage section 52, sorts the weights included in each weight group in the channel direction according to the order information, and stores the sorted weights in the weight storage section 52 again. As described, the weight sorting section 316 addresses the fact that the input data is changed due to the rearrangement of the weight groups in the preceding layer by changing the associations between the weights included in each weight group and the input data. The convolutional layer control section 40 operates identically to those in the first and the second exemplary embodiments after the weight sorting section 316 finishes sorting the weights.

Figure 14A:
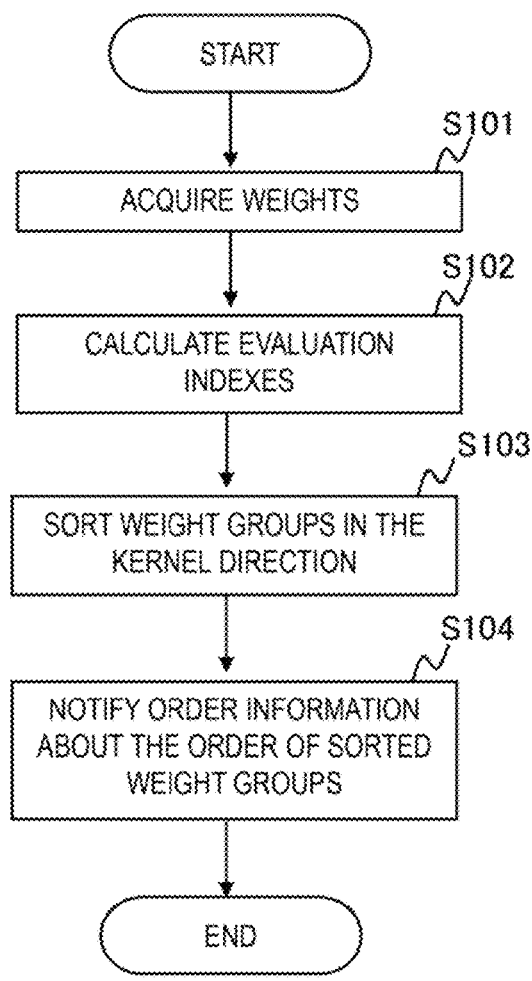
FIGS. 14A and 14B are flowcharts for explaining the operation of the convolutional layer control section relating to the third exemplary embodiment.
Figure 14B:
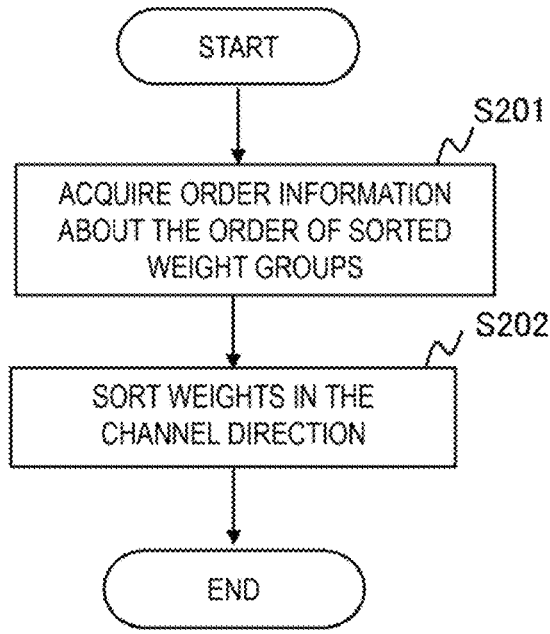

FIGS. 14A and 14B are flowcharts for explaining the operation of the convolutional layer control section 40 relating to the third exemplary embodiment. The operation of the convolutional layer control section 40 relating to the third exemplary embodiment will be described with reference to FIGS. 14A and 14B.

FIG. 14A is a flowchart showing the operation of the convolutional layer control section 40 in a case where weight groups are rearranged in the kernel direction.

First, the convolutional layer control section 40 acquires weights from the weight storage section 52 (step S101). Then, the convolutional layer control section 40 calculates the evaluation indexes (step S102). The convolutional layer control section 40 then sorts the weight groups in the kernel direction on the basis of the calculated evaluation indexes (step S103). The convolutional layer control section 40 then notifies the convolutional layer control section 40 of the subsequent layer of order information regarding the order of the rearranged weight groups.

FIG. 14B is a flowchart showing the operation of the convolutional layer control section 40 in a case where weights are rearranged in the channel direction.

First, the convolutional layer control section 40 acquires the order information from the convolutional layer control section 40 of the preceding layer (step S201). Then, the convolutional layer control section 40 sorts the weights included in each weight group in the channel direction on the basis of the acquired order information (step S202).

As described, in the third exemplary embodiment, weight groups are rearranged in the kernel direction in order to minimize discrepancy in activation sparsity. This rearrangement is performed such that the numbers of zeros included in output data are as close as possible between adjacent pieces of data. For instance, as shown in FIG. 13B, when the weight groups are sorted so that the total numbers of negative values in the weight groups are in descending order, since adjacent weight groups after rearrangement have similar amounts of negative values, they are more likely to have similar amounts of zeros in the processing results of the convolution operation. Since these processing results of the convolution operation correspond to the input data supplied to the subsequent layer, this rearrangement minimizes discrepancy in activation sparsity in the subsequent layer. This results in minimized discrepancy in activation sparsity for the PEs 42 that perform parallel processing in the subsequent layer, thereby avoiding significant variation in the execution time between the PEs 42 performing parallel processing. This can solve the problems that a slow-processing PE 42 becomes a bottleneck preventing the efficient utilization of the resources.

Next, a hardware configuration of the inference apparatuses 10 relating to the first to the third exemplary embodiments will be described.

Figure 15:
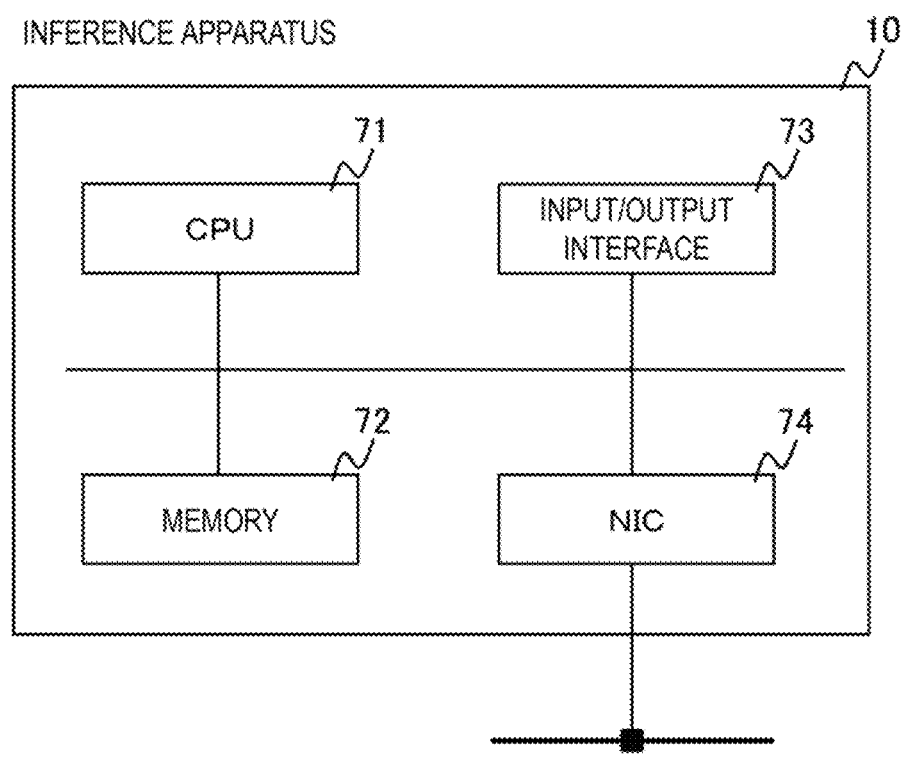
FIG. 15 is a drawing illustrating an example of a hardware configuration of the inference apparatus.

FIG. 15 is a drawing illustrating an example of a hardware configuration of the inference apparatus 10. The inference apparatus 10 may be constituted by a computer and comprises the configuration illustrated in FIG. 15. For instance, the inference apparatus 10 includes a CPU (Central Processing Unit) 71, a memory 72, an input/output interface 73, and a NIC (Network Interface Card) 74, which is communication means, all interconnected by internal buses.

Note that the hardware configuration of the inference apparatus 10 is not limited to the configuration shown in FIG. 15. The inference apparatus 10 may include hardware not shown in the drawing. Further, the illustration in FIG. 15 does not limit the number of CPUs included in the inference apparatus 10, and for instance, the inference apparatus 10 may include a plurality of CPUs.

The memory 72 is a RAM (Random Access Memory), ROM (Read-Only Memory), or auxiliary storage (such as a hard disk).

The input/output interface 73 is means for serving an interface to a display device or input device not shown in the drawing. The display device is for instance a liquid-crystal display. The input device is for instance a device such as a keyboard or mouse that accepts user operations.

The functions of the inference apparatus 10 are realized by the processing modules described above. For instance, the CPU 71 implements these processing modules by executing a program stored in the memory 72. Further, this program may be updated by downloading an update via a network, or using a storage medium storing the program. In addition, the processing modules may be realized by a semiconductor chip. In other words, the functions performed by the processing modules may be realized by running software on some kind of hardware.

[Variation]

The inference apparatuses 10 described in the first to the third exemplary embodiments are merely examples, and the configuration and operation of the inference apparatus are not limited thereto. The following describes various variations.

The exemplary embodiments above mainly described the cases where the convolution operation is performed by dividing the weights in the channel direction, however, it is not necessary to divide the weights in the channel direction. For instance, FIG. 6 illustrates a case where four PEs process the weights in the channel direction in parallel, however, eight PEs may process all the weights in the channel direction in parallel.

In the exemplary embodiments above, each PE 42 sequentially processes a plurality of weight groups and a plurality of weights assigned thereto, however, the processing may not have to be sequential. For instance, in FIG. 6, the PE (0, 0) processes the backmost weight included the weight group of the first row and then processes the fifth weight from the back in the exemplary embodiment described above. A set of four PEs may be formed by the PEs (0, 0) to (3, 0), and these PEs may process in parallel up to the fourth weights from the back included the weight group of the first row. These four PEs (0, 0) to (3, 0) may process in parallel the fifth to the eighth (foremost) weights from the back included the weight group of the first row thereafter.

In the exemplary embodiments above, even when a read weight element is "0," the weight readout section 62 notifies the multiplication/addition section 63 of this "0" element. However, when the value of a read weight is "0," the weight readout section 62 may simply notify the multiplication/addition section 63 of this fact. In this case, the multiplication/addition section 63 does not have to perform multiplication with input data (it can skip multiplication) when receiving a notification that the read value is "0."

The exemplary embodiment above described the configuration in which each PE 42 includes the input data processing section 61, however, a common module corresponding to the input data processing section 61 may be provided for the PEs 42 in the kernel direction. Since the same input data is supplied to the PEs 42 that process the input data of the same channel as described above, the operation by the input data processing section 61 with respect to the detection of non-zero elements will be the same. Therefore, the common input data processing section 61 may notify (broadcast) non-zero elements and the indexes thereof to each PE 42.

Alternatively, the input data processing section 61 included in each PE 42 may be provided behind the result storage section 53. Since the output data of a first layer becomes the input data of a second layer as described above, the process of detecting non-zero elements and the indexes thereof may be performed in advance in the first layer so that the second layer does not have to perform the same process on the input data thereof.

The exemplary embodiment above described the configuration in which each PE 42 includes the weight primary storage section 64, however, each PE 42 may directly read a required weight from the weight storage section 52. For instance, the convolutional layer control section 40 may notify each PE 42 of address information of a required weight. The weight readout section 62 of each PE 42 may read the required weight according to this address information.

In the exemplary embodiments above, the standby section 43 and the result addition section 44 are different modules, however, the functions of one of the modules may be implemented by the other. In other words, the standby section 43 and the result addition section 44 may be integrated with each other.

In the third exemplary embodiment, the weight groups are sorted so that the evaluation indexes are in descending order, however, it goes without saying that the weight groups may be sorted so that the evaluation indexes are in ascending order. In the case where the weight groups are sorted so that the evaluation indexes are in descending order, input data having many zeros at the beginning is processed in parallel in the subsequent layer. In the case where the weight groups are sorted so that the evaluation indexes are in ascending order, input data having many non-zero elements at the beginning is processed in parallel in the subsequent layer.

In the third exemplary embodiment, the total number of negative values included in each weight group is calculated as an index for evaluating the weight group, however, other values may be calculated as the evaluation index. For instance, the sum of elements in each weight group may be calculated as the evaluation index. In the example of FIG. 13A, as the evaluation index of the weight group $W_{G0}$, "−4" is calculated as the sum of the elements (−1+0+0−1+0+1+0−1+0+1+1−3+0+1+0−2=−4).

Figure 16:
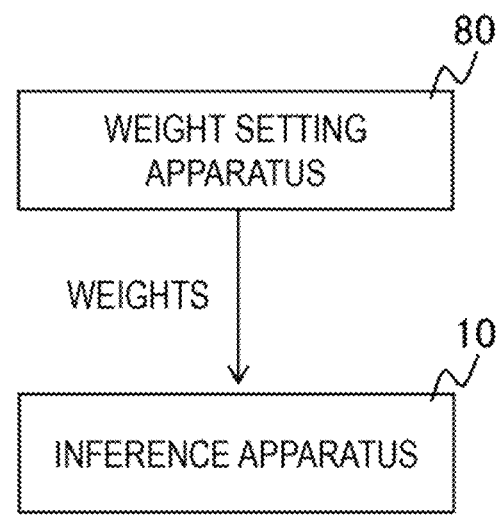
FIG. 16 is a drawing illustrating an example of a system configuration including a weight setting apparatus and the inference apparatus.

In the third exemplary embodiment, the inference apparatus 10 rearranges the weight groups during the process of inferring input data, however, this rearrangement may be executed before weight groups are set in the inference apparatus 10. More specifically, as shown in FIG. 16, a weight setting apparatus 80 that externally sets trained weights in the inference apparatus 10 may rearrange weight groups.

Alternatively, in a case where the inference apparatus 10 operates using trained weights obtained from another party, weight groups are rearranged in advance.

Figure 17:
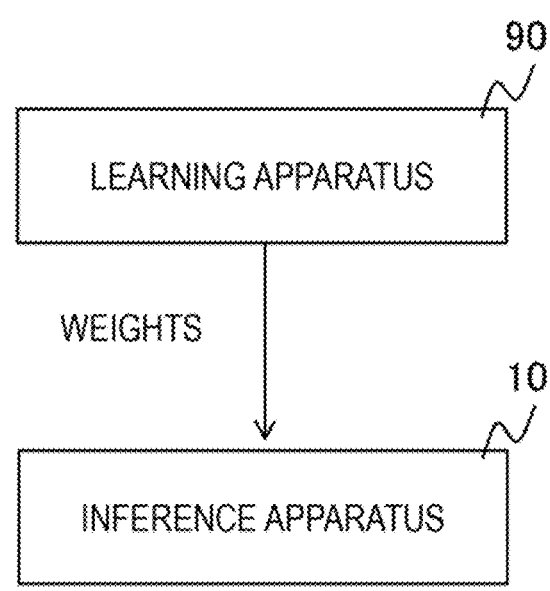
FIG. 17 is a drawing illustrating an example of a system configuration including a learning apparatus and the inference apparatus.
Figure 18:
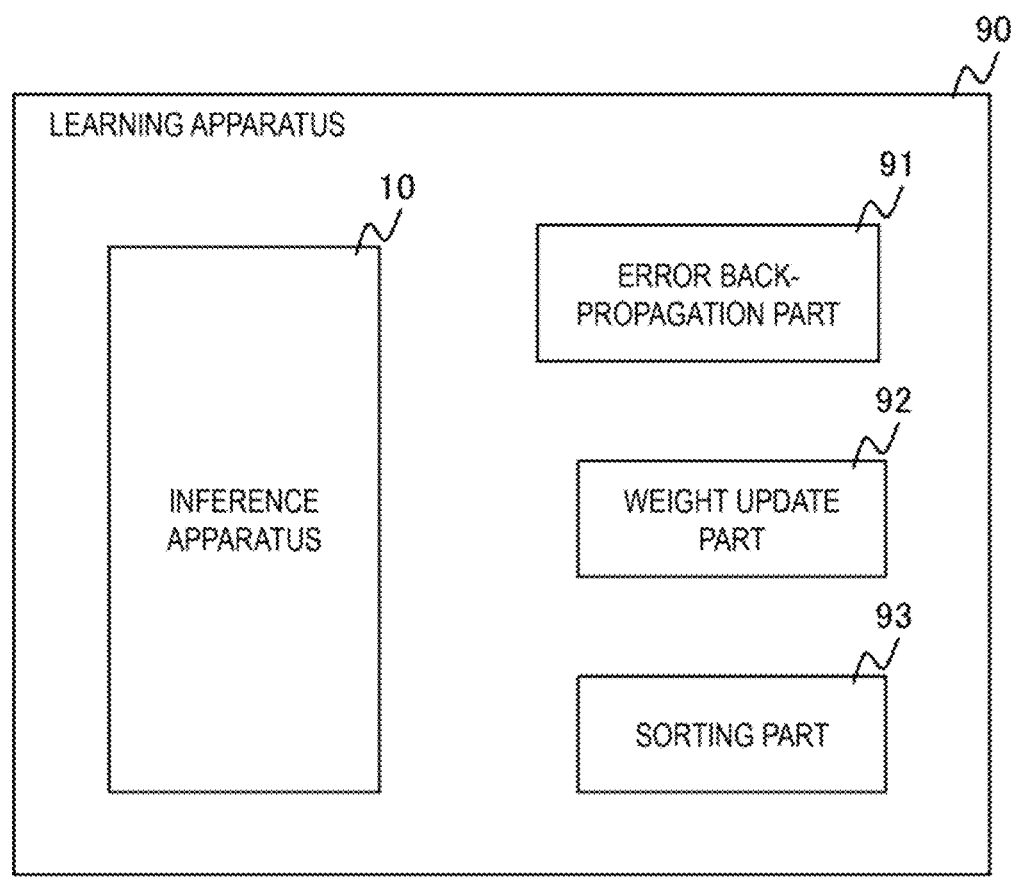
FIG. 18 is a drawing illustrating an example of an internal configuration of the learning apparatus shown in FIG. 17.

Furthermore, as shown in FIG. 17, a learning apparatus 90 that provides weights to the inference apparatus 10 may rearrange weight groups. The learning apparatus 90 performs learning processes using training data in which "inference," "estimated error feedback (error back-propagation)," and "weight update" are repeated. This series of learning processes may include "inference," "estimated error feedback," "weight update," and "sorting of weights (weight groups)." In a case where an inference part in the learning apparatus 90 utilizes activation sparsity, the learning apparatus 90 can benefit from the effects of the third exemplary embodiment by changing the learning flow as described above. Note that there is no difference between the inference apparatus 10 and the learning apparatus 90 from the viewpoint of utilizing a convolutional neural network (the operation of the intermediate layer). The input data to the inference apparatus 10 is data to be inferred and the input data to the inference part of the learning apparatus 90 is training data, however, there is no difference between them in terms of "inference." In other words, the learning apparatus 90 may be constituted by adding an error back-propagation part 91 that performs error back-propagation, an weight update part 92 that updates weights, and a sorting part 93 that sorts weights (weight groups) to the inference apparatus 10 described above (refer to FIG. 18). Note that the error back-propagation part 91 and the weight update part 92 can be realized by known algorithms. Further, the sorting part 93 can be realized by the functions of the evaluation index calculation section 312, the weight group sorting section 313, and the weight sorting section 316 described in the third exemplary embodiment.

Some or all of the exemplary embodiments above can be described as (but not limited to) the following modes.

[Mode 1]

As the inference apparatus relating to the first aspect.

[Mode 2]

The inference apparatus according to preferably Mode 1, wherein the control part controls the plurality of PEs so that some of multiplications between each of the plurality of pieces of input data and each weight corresponding to each of the plurality of pieces of input data are performed in parallel.

[Mode 3]

The inference apparatus according to preferably Mode 2, wherein the control part controls the plurality of PEs so that, out of multiplications between each of the plurality of pieces of input data and each of the plurality of weights included in a plurality of the weight groups, some of multiplications using weights belonging to different weight groups, but corresponding to the same input data are executed in parallel.

[Mode 4]

The inference apparatus according to preferably Mode 3 further comprising an input data division section that divides the plurality of pieces of input data and supplies the divided pieces of input data to the PEs that perform the some of multiplications in parallel.

[Mode 5]

The inference apparatus according to preferably Mode 3 or 4 further comprising a standby section that stands by until the plurality of PEs that perform the some of multiplications in parallel complete the computation thereof.

[Mode 6]

The inference apparatus according to preferably any one of Modes 3 to 5 further comprising a result addition section that adds up the results of multiplications between each of the plurality of pieces of input data and a plurality of weights included in a weight group.

[Mode 7]

The inference apparatus according to preferably any one of Modes 1 to 6, wherein each of the plurality of PEs comprises:

an input data processing section that identifies a non-zero element having a non-zero value and the position of the non-zero element in received input data;

a weight readout section that reads a value at the position corresponding to the position of the non-zero element out of weight elements to be multiplied by the received input data from a storage medium that stores the weight groups;

a multiplication/addition section that multiplies the non-zero element by the value read by the weight readout section; and the multiplication/addition section adding up the multiplication results when multiplications with respect to non-zero elements included in the received input data are completed.

[Mode 8]

The inference apparatus according to preferably Mode 7, wherein each of the plurality of PEs further comprises a computation result storage section that stores the addition results computed by the multiplication/addition section.

[Mode 9]

The inference apparatus according to preferably any one of Modes 3 to 8, wherein the control part causes each of the plurality of PEs to execute a plurality of processes of multiplying a piece of input data by weights included in different weight groups in time division.

[Mode 10]

The inference apparatus according to preferably any one of Modes 1 to 9, wherein the control part comprises:

an evaluation index calculation section that calculates an evaluation index for evaluating the weight groups; and a weight group sorting section that sorts the order of the weight groups to be multiplied by input data on the basis of the evaluation index.

[Mode 11]

The inference apparatus according to preferably Mode 10, wherein the control part further comprises an order information notification section that notifies other layers of order information regarding the sorting of the weight groups.

[Mode 12]

The inference apparatus according to preferably Mode 11, wherein the control part further comprises:

an order information acquisition section that acquires the notified order information; and a weight sorting section that changes associations between input data and weights included in the weight groups on the basis of the order information.

[Mode 13]

As the convolution operation execution method relating to the second aspect.

[Mode 14]

As the program relating to the third aspect.

[Mode 15]

A learning apparatus that infers a weight using training data, feeds back an estimated weight error, updates weights, and sorts weights, wherein the sorting of weights is performed on the basis of an evaluation index for evaluating a weight.

Further, Modes 13 and 14 can be developed into Modes 2 to 12 as Mode 1.

Further, each disclosure of Patent Literatures, etc., cited above is incorporated herein in its entirety by reference thereto. It is to be noted that it is possible to modify or adjust the exemplary embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual exemplary embodiments and examples, and the individual elements of the individual figures) within the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

REFERENCE SIGNS LIST 10, 100: inference apparatus
11: input layer execution part
12: intermediate layer execution part
13: output layer execution part
31: convolutional layer execution section
32: activation function execution section
33: pooling layer execution section
40: convolutional layer control section
41: input data division section
42, 42-1 to 42-8, 101: PE (Processing Element)
43: standby section
44: result addition section
51: input data storage section
52: weight storage section
53: result storage section
60: PE control section
61: input data processing section
62: weight readout section
63: multiplication/addition section
64: weight primary storage section
65: computation result storage section
66: iterative control section
71: CPU (Central Processing Unit)
72: memory
73: input/output interface
74: NIC (Network Interface Card)
80: weight setting apparatus
90: learning apparatus
91: error back-propagation part
92: weight update part
93: sorting part
102: control part
311: weight acquisition section
312: evaluation index calculation section
313: weight group sorting section
314: order information notification section
315: order information acquisition section
316: weight sorting section
401, 402: data
501, 502: weight
511, 512, 521, 522: weight group

What is claimed is:

1. An inference apparatus, comprising:
a plurality of PEs (Processing Elements); and
a control part that comprises:
an evaluation index calculation section that calculates an evaluation index for evaluating a plurality of weight groups that each include a plurality of weights that each correspond to a plurality of pieces of input data;
a weight group sorting section that sorts an order of the weight groups to be multiplied by the plurality of pieces of input data based on the evaluation index; and
an order information notification section that notifies layers of order information regarding sorting of the weight groups;
wherein the control part operates a convolution operation in a convolutional neural network using each of a the plurality of pieces of input data and each of the plurality of weight groups by controlling the plurality of PEs; and
wherein each of the plurality of PEs executes a computation including multiplication of a single piece of the input data by a single weight and multiplication included in the convolution operation using an element with a non-zero value included in each of the plurality of pieces of input data.

2. The inference apparatus according to claim 1, wherein the control part controls the plurality of PEs so as to perform in parallel some multiplications between each of the plurality of pieces of input data and each weight corresponding to each of the plurality of pieces of input data.

3. The inference apparatus according to claim 2, wherein the control part controls the plurality of PEs so as to execute in parallel the some multiplications between each of the plurality of pieces of input data and each of the plurality of weights, where the weights used in the some of multiplications belong to different weight groups but correspond to a same piece of input data.

4. The inference apparatus according to claim 3, further comprising an input data division section that divides the plurality of pieces of input data and supplies the divided pieces of input data to the PEs that perform the some of multiplications in parallel.

5. The inference apparatus according to claim 3, further comprising a standby section in which the computation stands by until the plurality of PEs that perform the some of multiplications in parallel have finished performing the some of multiplications.

6. The inference apparatus according to claim 3, further comprising a result addition section that, for each weight group, adds together results of multiplications between each of the plurality of pieces of input data and the plurality of weights included in the each weight group.

7. The inference apparatus according to claim 1, wherein each of the plurality of PEs comprises:
an input data processing section that identifies a non-zero element having the non-zero value and the position of the non-zero element in received pieces of input data;
a weight readout section that reads a value at the position corresponding to the position of the non-zero element from the weights to be multiplied by the received pieces of input data from a storage medium that stores the plurality of weight groups; and a multiplication/addition section that multiplies the non-zero element by the value read by the weight readout section;

wherein the multiplication/addition section adds together multiplication results upon completion.

8. The inference apparatus according to claim 7, wherein each of the plurality of PEs further comprises a computation result storage section that stores addition results computed by the multiplication/addition section.

9. The inference apparatus according to claim 3, wherein the control part causes each of the plurality of PEs to execute a plurality of processes of multiplying a received piece of input data by the weights included in different weight groups in time division.

10. The inference apparatus according to claim 1, wherein the control part further comprises:

an order information acquisition section that acquires the notified order information; and a weight sorting section that changes associations between the pieces of input data and the plurality of weights included in the weight groups based on the order information.

11. A convolution operation execution method for an inference apparatus that includes a control part and a plurality of PEs (Processing Elements) each executing a computation including multiplication of a single piece of input data by a single weight and that operates a convolution operation in a convolutional neural network using each of a plurality of pieces of input data and a weight group including a plurality of weights that each correspond to each of the plurality of pieces of input data, the convolution operation execution method including:

causing the control part to calculate an evaluation index for evaluating weight groups including the weight group;

causing the control part to sort an order of the weight groups to be multiplied by the plurality of pieces of input data based on the evaluation index;

causing the control part to notify layers of order information regarding sorting of the weight groups;

causing each of the plurality of PEs to identify an element with a non-zero value included in each of the plurality of pieces of input data; and causing each of the plurality of PEs to execute multiplication included in the convolution operation using the identified element.

12. A non-transitory computer-readable storage medium storing a program causing a computer to execute:

calculating an evaluation index for evaluating weight groups that each include a plurality of weights that each correspond to a plurality of pieces of input data;

sorting an order of the weight groups to be multiplied by the plurality of pieces of input data based on the evaluation index;

notifying layers of order information regarding sorting of the weight groups;

identifying an element with a non-zero value included in each of the plurality of pieces of input data; and executing multiplication included in the convolution operation using the identified element, wherein the computer being is provided in an inference apparatus that includes a plurality of PEs (Processing Elements) each executing a computation including multiplication of a single piece of input data by a single weight and that operates a convolution operation in a convolutional neural network using each of the plurality of pieces of input data and one of the weight groups.

13. The convolution operation execution method according to claim 11, including:

controlling the plurality of PEs so as to perform in parallel some multiplications between each of the plurality of pieces of input data and each weight corresponding to each of the plurality of pieces of input data.

14. The convolution operation execution method according to claim 13, including:

controlling the plurality of PEs so as to execute in parallel the some multiplications between each of the plurality of pieces of input data and each of the plurality of weights, where the weights used in the some of multiplications belong to different weight groups but correspond to a same piece of input data.

15. The convolution operation execution method according to claim 14, including:

dividing the plurality of pieces of input data, and supplying the divided pieces of input data to the PEs that perform the some of multiplications in parallel.

16. The non-transitory computer-readable storage medium storing a program according to claim 12, causing the computer to execute:

controlling the plurality of PEs so as to perform in parallel some multiplications between each of the plurality of pieces of input data and each weight corresponding to each of the plurality of pieces of input data.

17. The non-transitory computer-readable storage medium storing a program according to claim 16, causing the computer to execute:

controlling the plurality of PEs so as to execute in parallel the some multiplications between each of the plurality of pieces of input data and each of the plurality of weights, where the weights used in the some of multiplications belong to different weight groups but correspond to a same piece of input data.

18. The non-transitory computer-readable storage medium storing a program according to claim 16, causing the computer to execute:

dividing the plurality of pieces of input data, and supplying the divided pieces of input data to the PEs that perform the some of multiplications in parallel.

19. The convolution operation execution method according to claim 11, further comprises:

causing the control part to acquire the notified order information; and causing the control part to change associations between the pieces of input data and the plurality of weights included in the weight groups based on the order information.

20. The non-transitory computer-readable storage medium storing a program according to claim 12, further comprises:

acquiring the notified order information; and changing associations between the pieces of input data and the plurality of weights included in the weight groups based on the order information.

* * * * *